US012744630B2

(12) United States Patent
Shreevastav et al.

(10) Patent No.: US 12,744,630 B2
(45) Date of Patent: Sep. 22, 2026

(54) USER EQUIPMENT SPECIFIC UPLINK REFERENCE SIGNAL TRANSMISSION IN LOW POWER STATE FOR MITIGATING INTERFERENCE

(71) Applicant: Telefonaktiebolaget LM Ericsson (PUBL), Stockholm (SE)

(72) Inventors: Ritesh Shreevastav, Upplands Väsby (SE); Åke Busin, Sollentuna (SE); Siva Muruganathan, Stittsville (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 291 days.

(21) Appl. No.: 18/292,006

(22) PCT Filed: Jul. 15, 2022

(86) PCT No.: PCT/SE2022/050715

§ 371 (c)(1), (2) Date: Jan. 25, 2024

(87) PCT Pub. No.: WO2023/009050

PCT Pub. Date: Feb. 2, 2023

(65) Prior Publication Data

US 2024/0364466 A1 Oct. 31, 2024

Related U.S. Application Data

(60) Provisional application No. 63/226,260, filed on Jul. 28, 2021.

(51) Int. Cl.
*H04L 5/00* (2006.01)
*H04W 72/51* (2023.01)
(Continued)

(52) U.S. Cl.
CPC .......... *H04L 5/0035* (2013.01); *H04L 5/0053* (2013.01); *H04W 72/51* (2023.01); *H04W 72/541* (2023.01); *H04W 88/06* (2013.01)

(58) Field of Classification Search
CPC .... H04W 72/51; H04W 72/541; H04W 88/06
See application file for complete search history.

(56) References Cited

U.S. PATENT DOCUMENTS

2011/0306347 A1 12/2011 Choi et al.
2018/0278450 A1 9/2018 Zarifi et al.
(Continued)

FOREIGN PATENT DOCUMENTS

CN 111867034 A 10/2020
JP 2016-508304 A2 3/2016
(Continued)

OTHER PUBLICATIONS

Office Action issued for Japanese Patent Application No. 2023-576423—Dec. 2, 2024.

(Continued)

*Primary Examiner* — Melvin C Marcelo
(74) *Attorney, Agent, or Firm* — Baker Botts L.L.P.

(57) ABSTRACT

A method (1100) by a user equipment, UE, (512) for unique identification of the UE for positioning includes transmitting (1102), to a network node (510), an uplink signal that is generated based on a unique identifier associated with the UE or that uses a preamble that is reserved for positioning.

18 Claims, 14 Drawing Sheets

1102

Transmit, to a network node, an uplink signal that is generated based on a unique identifier associated with the UE or that uses a preamble that is reserved for positioning

(51) Int. Cl.
*H04W 72/541* (2023.01)
*H04W 88/06* (2009.01)

(56) References Cited

U.S. PATENT DOCUMENTS

2020/0229130 A1* 7/2020 Keating ............ H04W 52/0229
2024/0137897 A1* 4/2024 Goyal ................... G01S 5/0205
2024/0163836 A1* 5/2024 Khoryaev ............. H04L 5/0051

FOREIGN PATENT DOCUMENTS

WO WO2019194021 A1 10/2019
WO WO2020197829 A1 10/2020
WO WO2021091472 A1 5/2021
WO WO2021119127 A1 6/2021

OTHER PUBLICATIONS

3GPP TS 38.455 V16.4.0 (Jul. 2021); 3rd Generation Partnership Project; Technical Specification Group Radio Access Network; NG-RAN; NR Positioning Protocol A (NRPPa) (Release 16).
PCT International Search Report issued for International application No. PCT/SE2022/050715—Oct. 27, 2022.
PCT Written Opinion of the International Searching Authority issued for International application No. PCT/SE2022/050715—Oct. 27, 2022.
Decision of Dismissal issued for Japanese Patent Application Serial No. 2023 576423, Jun. 4, 2025.
Office Action issued for Japanese Patent Application Serial No. 2023 576423, Jun. 4, 2025.

* cited by examiner

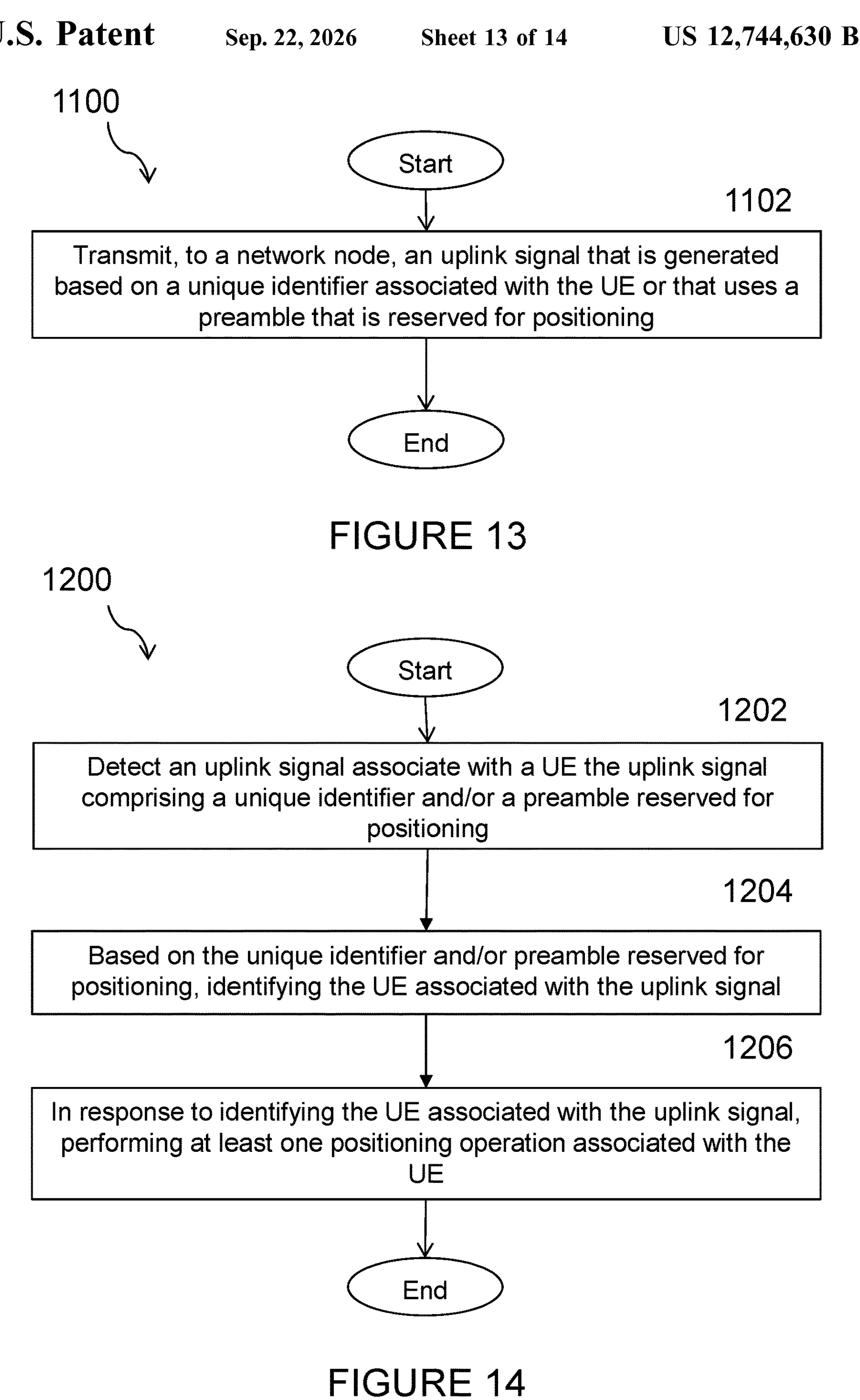
1100
Start
1102
Transmit, to a network node, an uplink signal that is generated based on a unique identifier associated with the UE or that uses a preamble that is reserved for positioning
End
FIGURE 13
1200
Start
1202
Detect an uplink signal associate with a UE the uplink signal comprising a unique identifier and/or a preamble reserved for positioning
1204
Based on the unique identifier and/or preamble reserved for positioning, identifying the UE associated with the uplink signal
1206
In response to identifying the UE associated with the uplink signal, performing at least one positioning operation associated with the UE
End
FIGURE 14

USER EQUIPMENT SPECIFIC UPLINK REFERENCE SIGNAL TRANSMISSION IN LOW POWER STATE FOR MITIGATING INTERFERENCE

PRIORITY

This nonprovisional application is a U.S. National Stage Filing under 35 U.S.C. § 371 of International Patent Application Serial No. PCT/SE2022/050715 filed Jul. 15, 2022 and entitled "User Equipment Specific Uplink Reference Signal Transmission in Low Power State For Mitigating Interference" which claims priority to U.S. Provisional Patent Application No. 63/226,260 filed Jul. 28, 2021, both of which are hereby incorporated by reference in their entirety.

TECHNICAL FIELD

The present disclosure relates, in general, to wireless communications and, more particularly, systems and methods for methods and systems for user equipment (UE) specific uplink (UL) reference signal transmission in low power state for mitigating interference.

BACKGROUND

FIG. 1 illustrates the New Radio (NR) Positioning architecture. More specifically, FIG. 1 illustrates Next Generation-Radio Access Network (NG-RAN) Release-15 (Rel-15) Location Service (LCS) protocols. Location Management Function (LMF) is the location node in NR. There are also interactions between the location node and the gNodeB (gNB) via the NR Positioning Protocol A (NRPPa) protocol. The interactions between the gNodeB and the device (e.g., User Equipment (UE)) is supported via the Radio Resource Control (RRC) protocol. It is noted that the gNB and Next Generation-eNodeB (ng-eNB) may not always both be present. It is additionally noted that when both the gNB and ng-eNB are present, the Next Generation Core (NG-C) interface is only present for one of them.

NR supports the following Radio Access Technology (RAT) Dependent positioning methods:

- Downlink-Time Difference of Arrival (DL-TDOA): The DL TDOA positioning method makes use of the downlink (DL) Reference Signal Time Difference (RSTD) (and optionally DL Positioning Reference Signal Reference Signal Received Power (PRS RSRP)) of DL signals received, at the UE, from multiple Transmission Points (TPs). The UE measures the DL RSTD (and optionally DL PRS RSRP) of the received signals using assistance data received from the positioning server, and the resulting measurements are used along with other configuration information to locate the UE in relation to the neighbouring TPs.
- Multi-Return Trip Time (Multi-RTT): The Multi-RTT positioning method makes use of the UE Receiver-Transmitter (Rx−Tx) measurements and DL PRS RSRP of DL signals received from multiple Transmission Reception Points (TRPs), measured by the UE and the measured gNB Rx−Tx measurements and UL SRS-RSRP at multiple TRPs of uplink signals transmitted from UE.
- Uplink-TDOA (UL-TDOA): The uplink (UL) TDOA positioning method makes use of the UL TDOA (and optionally UL SRS-RSRP) at multiple Receiver Points (RPs) of UL signals transmitted from UE. The RPs measure the UL TDOA (and optionally UL SRS-RSRP) of the received signals using assistance data received from the positioning server, and the resulting measurements are used along with other configuration information to estimate the location of the UE.
- Downlink Azimuth of Departure (DL-AoD): The DL AoD positioning method makes use of the measured DL PRS RSRP of DL signals received, at the UE, from multiple TPs. The UE measures the DL PRS RSRP of the received signals using assistance data received from the positioning server, and the resulting measurements are used along with other configuration information to locate the UE in relation to the neighbouring TPs.
- Uplink-Azimuth of Arrival (UL-AoA): The UL AoA positioning method makes use of the measured azimuth and zenith of arrival at multiple RPs of UL signals transmitted from the UE. The RPs measure A-AoA and Z-AoA of the received signals using assistance data received from the positioning server, and the resulting measurements are used along with other configuration information to estimate the location of the UE.
- New Radio-Enhanced Cell Identifier (NR-ECID): NR Enhanced Cell ID (NR E-CID) positioning refers to techniques which use additional UE measurements and/or NR radio resource and other measurements to improve the UE location estimate.

Uplink Sounding Reference Signal (UL-SRS)

NR Release-16 (Rel-16) defines positioning specific Sounding Reference Signal (SRS). LMF recommends the needed characteristics for SRS transmission to gNB. gNB makes the final decision and provides the SRS configuration to the UE. The recommendation from LMF may include a needed number of resource sets and resources per resource set, the type of SRS among (aperiodic, semi-persistent or periodic), spatial relations between UL SRS and DL Positioning Reference Signal (PRS), activation time, etc. Application Management Function (AMF) routes the information between LMF and gNB (via NRPPa) or between LMF and UE (via LTE Positioning Protocol (LPP)).

In NR, the following UL SRS based positioning methods have been defined:

- Uplink TDOA (UTDOA): According to UTDOA, the device (e.g., UE) is requested to transmit a specific waveform that is detected by multiple location measurement units (e.g. listening devices (Reception Points), gNB-Distributed Unit (gNB-DU), TRP, gNB, etc.) at known positions. These measurements are forwarded to Evolved Serving Mobile Location Center (E-SMLC) for multilateration.
- Multi-RTT: According to Multi-RTT, the device computes UE Rx−Tx and gNBs computes gNB Rx−Tx. The result is combined to find the UE position based upon round trip time calculation. Example definitions of these measurements is disclosed in $_3$GPP TS 38.215 V16.4.0.
- UL-AoA: According to UL-AoA, gNB calculates the UL AoA based upon UE's UL SRS transmissions.

Physical Random Access Channel (PRACH) Based Timing Advance

When looking at the LPP/NRPPa specifications, in Evolved Universal Terrestrial Radio Access (E-UTRA) Radio Access Technology (RAT), the eNBs/ng-eNBs are able to report E-UTRA Angle of Arrival and Timing Advance Type 1/Type 2 in E-CID to the location server. Timing Advance Type 2, which is eNodeB (eNB) Rx−Tx time difference measurement, is based upon PRACH, which is considered a usual and required measurement to be signalled by UE to gNB in order to perform communication. Thus, it should already be supported by all networks. The two types of Timing Advance ($T_{ADV}$ or TA) are discussed in Section 5.2.4 of 3GPP TS 36.214 as follows:

Type1: Timing advance ($T_{ADV}$) type 1 is defined as the time difference $$T_{ADV}=(\text{eNB Rx–Tx time difference})+(\text{UE Rx–Tx time difference}),$$

where the eNB Rx–Tx time difference corresponds to the same UE that reports the UE Rx–Tx time difference.

Type2: Timing advance ($T_{ADV}$) type 2 is defined as the time difference $$T_{ADV}=(\text{eNB Rx–Tx time difference}),$$

where the eNB Rx–Tx time difference corresponds to a received uplink radio frame containing PRACH from the respective UE or similarly NPRACH from the respective NB-IoT UE.

Release-17 (Rel-17) positioning focuses on Industrial Internet of Things (IIOT) positioning where Non-public Network (NPN) based deployment is expected to be widely used. Even in NPN architecture, the role of AMF is necessary to ensure privacy and provide subscription and authentication.

There currently exist certain challenge(s), however. For example, it has been discussed to provide support for UL SRS transmission also in Inactive state as part of Rel-17 System Information (SI). One major issue, however, is that controlling UE UL transmission in inactive mode may not be easy. What should be the direction and power of transmission? If UE is moving, what sort of timing advance value it should apply for the UL SRS transmission so that it is synchronized with the base stations reception points (RP) and further does not cause interference.

In a controlled environment such as a factory implementing IIOT, there may be limited moving devices to be tracked and interference could possibly be mitigated by some local co-ordination. In such scenario, if there are many listening devices, the inactive UL SRS transmission may still be possible. However, when there are fewer listening devices, it may be difficult for LMF to co-ordinate with all the devices via NRPPa to listen to certain UL SRS transmission. There may involve massive amount of signaling to co-ordinate.

FIG. 2 illustrates an example scenario where a UE in inactive mode may move in the cell. In the figure, RPi are the listening nodes and RP1 is the serving node that is serving the UE in a cell. Based upon UE location, the optimum listening nodes that need to be configured at location 1 are RP1, RP2, RP3, and RP8. Similarly, if UE moves to cell location 2, then the optimum listening nodes that need to be configured are RP6, RP7, and RP8. If the UE moves to cell location 3, then the optimum listening nodes that need to be configured are RP5, RP4, and RP6. However, when the UE is not in connected node, it is not possible for LMF to dynamically release and allocate new listening nodes. Additionally, if LMF has to pre-configure and prepare the listening nodes, there may be massive signaling involved. Thus, mechanism(s) are needed to reduce or alleviate NRPPa/F1AP signaling load.

SUMMARY

Certain aspects of the disclosure and their embodiments may provide solutions to these or other challenges. For example, certain embodiments enable listening devices (RPs) to be able to identify which UE's UL SRS is received based on detecting and measuring the UL SRS. These listening devices can then report the measurement report for a certain UE that is in inactive state to the LMF. According to certain embodiments, the listening devices may also report the detected Rx power of the UL SRS transmission to LMF. Based on the reported information, the LMF, serving gNB, or a listening gNB may decide if the UE in inactive mode is causing interference. In such case, the LMF would notify AMF to page to that UE so the UE will come to connected mode and the UL SRS configuration will be reconfigured.

According to certain embodiments, a method by a UE for unique identification of the UE for positioning includes transmitting, to a network node, an uplink signal that is generated based on a unique identifier associated with the UE or that uses a preamble that is reserved for positioning.

According to certain embodiments, a UE for unique identification of the UE for positioning is adapted to transmit, to a network node, an uplink signal that is generated based on a unique identifier associated with the UE or that uses a preamble that is reserved for positioning.

According to certain embodiments, a method by a first network node comprising a gNodeB and/or a listening node includes detecting an uplink signal associated with a UE. The uplink signal comprises a unique identifier or a preamble reserved for positioning. Based on the unique identifier or the preamble reserved for positioning, the first network node identifies the UE associated with the uplink signal. In response to identifying the UE associated with the uplink signal, the first network node performs at least one positioning operation associated with the UE.

According to certain embodiments, a first network node comprising a gNodeB and/or a listening node is adapted to detect an uplink signal associated with a UE. The uplink signal comprises a unique identifier or a preamble reserved for positioning. Based on the unique identifier or the preamble reserved for positioning, the first network node is adapted to identify the UE associated with the uplink signal. In response to identifying the UE associated with the uplink signal, the first network node is adapted to perform at least one positioning operation associated with the UE.

According to certain embodiments, a method by a core network node operating as a LMF includes receiving, from a second network node operating as a gNodeB or listening node, a mapping of a unique identifier associated with a UE to a sequence identifier. The core network node transmits, to a third network node, the sequence identifier to be used by the UE.

According to certain embodiments, a core network node operating as a LMF is adapted to receive, from a second network node operating as a gNodeB or listening node, a mapping of a unique identifier associated with a UE to a sequence identifier. The core network node is adapted to transmit, to a third network node, the sequence identifier to be used by the UE.

Certain embodiments may provide one or more of the following technical advantage(s). For example, certain embodiments may provide a technical advantage of enabling inactive mode positioning. Accordingly, a UE can save power being in inactive state and still can be positioned. As a result, certain embodiments disclosed herein may help reduce UE power while still enabling positioning in inactive mode. As another example, certain embodiments may provide a technical advantage of helping to reduce NRPPa/

F1AP signaling load. As still other examples, certain embodiments may provide one or more of the following technical advantages:

- enabling efficient positioning measurement in RRC Inactive or Idle state,
- enabling UE ID specific UL SRS (or UL PRS) transmission where AMF, LMF and gNB coordinate efforts to enable unique UL SRS (or UL PRS) transmission,
- enabling interference suppression due to UL SRS (or UL PRS) transmission in Inactive or Idle mode,
- enabling, identification of UE using UL SRS (or UL PRS) transmission such that UE can be paged, and/or
- enabling fast reconfiguration of UL SRS.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 13 illustrates a method by a UE for unique identification of the UE for positioning, according to certain embodiments;

FIG. 14 illustrates a method by a first network node comprising a gNodeB and/or a listening node, according to certain embodiments.

DETAILED DESCRIPTION

Figure 1:
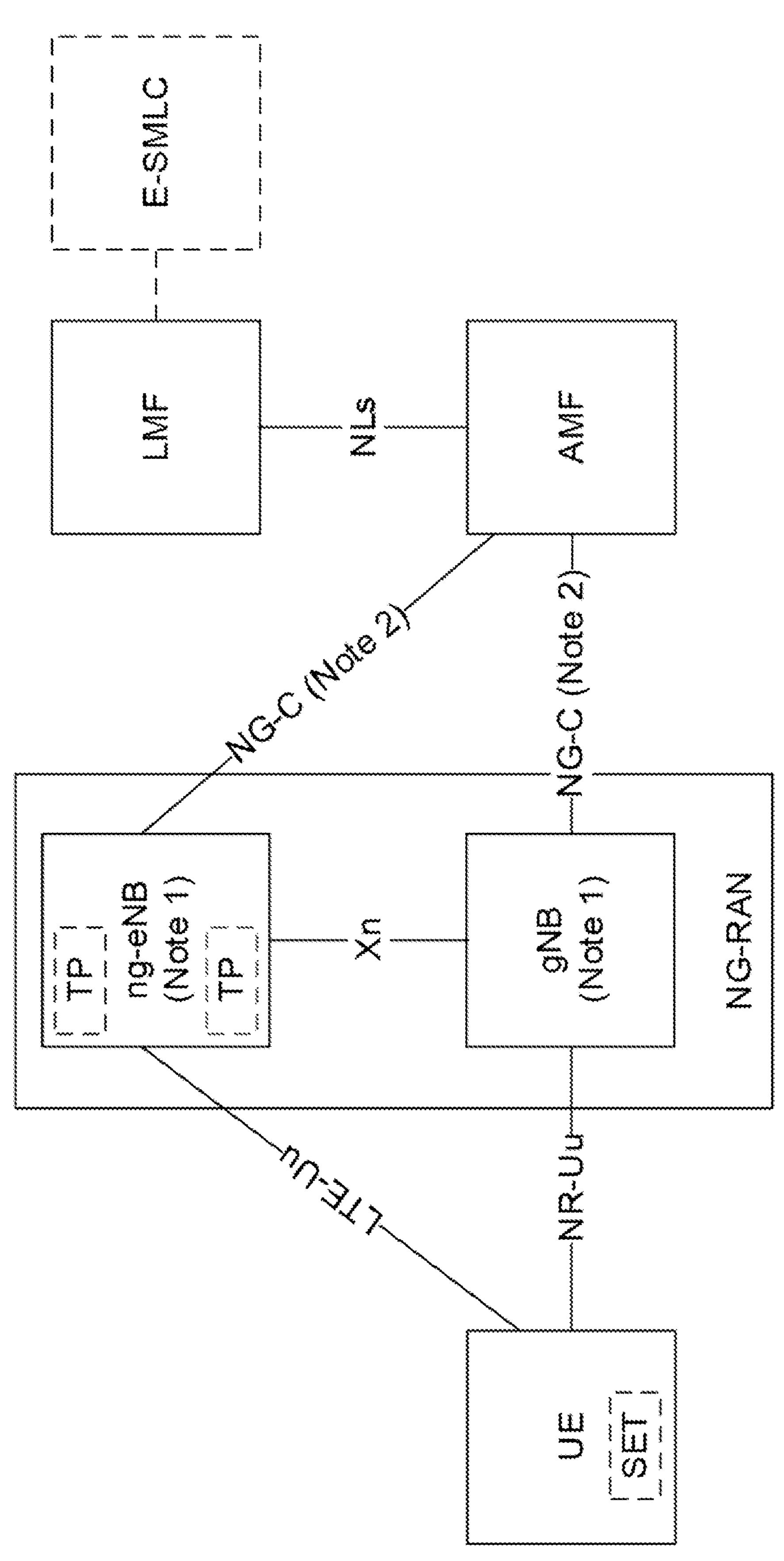
FIG. 1 illustrates the NR Positioning architecture.
Figure 2:
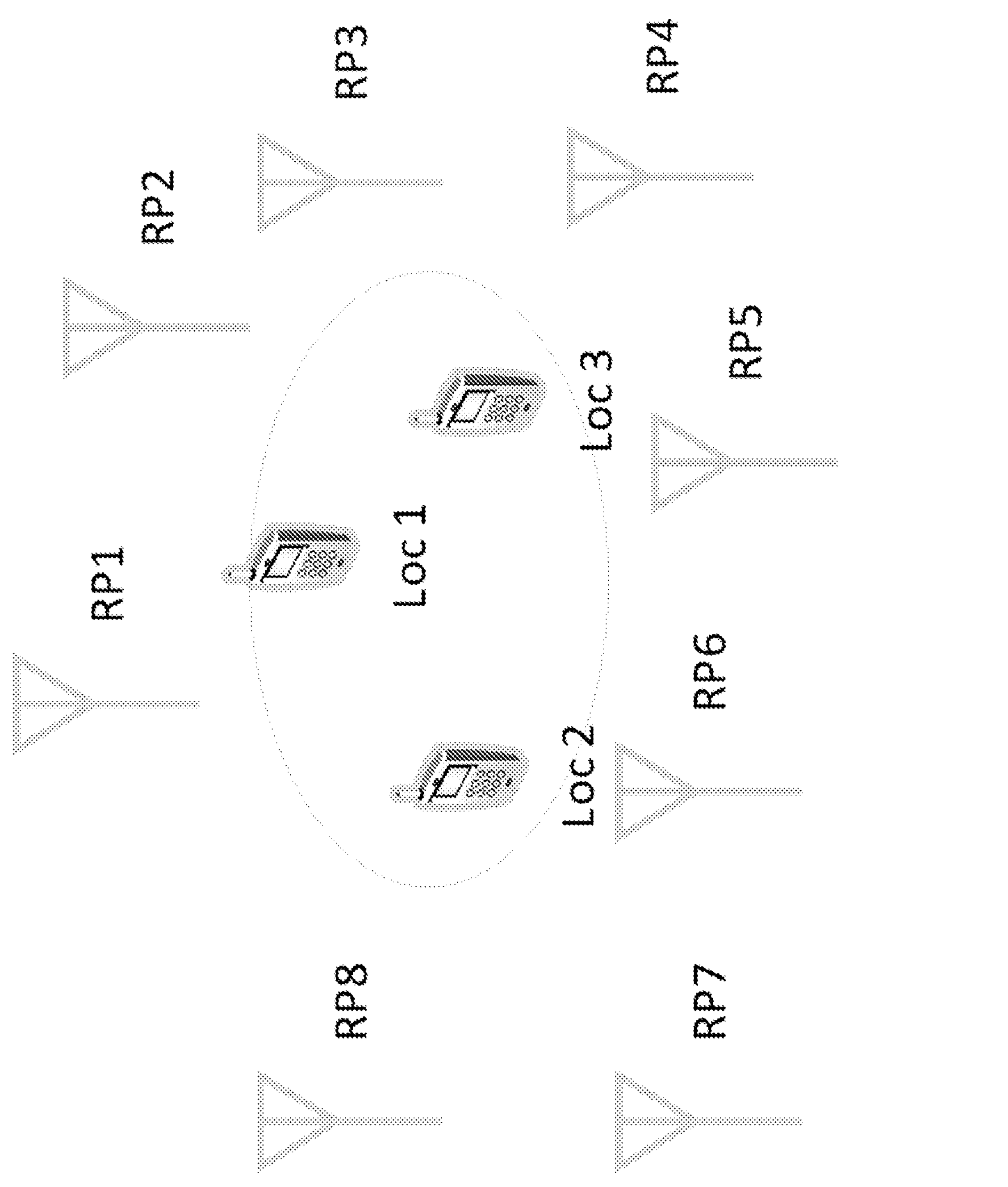
FIG. 2 illustrates an example scenario where a UE in inactive mode may move in the cell.

Some of the embodiments contemplated herein will now be described more fully with reference to the accompanying drawings. Embodiments are provided by way of example to convey the scope of the subject matter to those skilled in the art.

Rather than providing the NRPPa signaling to configure to listen about when UE will transmit, certain embodiments disclosed herein enable listening devices such as, for example, RPs, to be able to identify which UE's UL SRS is received by detecting and measuring the UL SRS. These listening devices can then report to the LMF the measurement report for a certain UE that is in an inactive state. The listening device may also include the detected Rx power corresponding UL SRS transmission to LMF. According to certain embodiments, the LMF, serving gNB, or listening gNB may decide if the UE in inactive mode is causing interference. In such case, the LMF may notify the AMF to page the UE so the UE will come to connected mode and the UL SRS configuration will be reconfigured. Alternatively, the AMF may notify the gNB, which then may page the UE. In still another scenario related to RAN-based paging, the gNB may directly manage the paging without the involvement of the AMF.

According to certain embodiments, UE specific UL SRS based transmission may be used so that RPs can identify which UE is transmitting without much co-ordination needed from LMF.

For example, according to certain embodiments, a method performed by wireless device is provided to transmit reference signal such that the reference signal uniquely identifies temporary UE ID used for positioning in RRC Inactive or Idle mode(s) which has been provided by a core network node. According to certain embodiments, a method performed by wireless device is provided to obtain where in spatial domain (Cells, radio network area) the ID is valid.

According to certain embodiments, method performed by wireless device is provided to notify the NW node upon changing the geographic location (cells) where the positioning ID is invalid.

According to certain embodiments, a method performed by a network reception point is provided to identify the UE based upon the detected sequence generation ID. The network reception point provides the identified ID along with the measurement results to the location server for positioning computation.

According to certain embodiments, a method performed by core network node is provided to maintain (have a mapping table/function) for the UE positioning ID to the UE IMSI/TMSI.

In current specifications, the UL SRS transmission is based on the below sequence ID $$n_{ID}^{SRS}$$

and is not UE Identifier (UE ID) specific. The current definition from 3GPP TS 38.211 v 16.6.0 is given below:

The SRS sequence identity $$n_{ID}^{SRS}$$

is given by the higher layer parameter sequenceId in the SRS SRS-Config IE, in which case $$n_{ID}^{SRS}$$

$\in \{0, 1, \ldots, 1023\}$, or the [SRS-for-positioning] IE, in which case $$n_{ID}^{SRS}$$

$\in \{0, 1, \ldots, 65535\}$. The quantity 1'

$$\in \{0, 1, \ldots, N_{symb}^{SRS} - 1\}$$

is the [Orthogonal Frequency Division Multiplexing (OFDM)] symbol number within the SRS resource. However, according to certain embodiments disclosed herein, a unique UL SRS generation may be used that enables identification of UE ID or helps/enables mapping of SRS ID or sequence ID UE ID. For this purpose, a separate UL PRS (or alternatively an UL Positioning reference signal) is designed which can be based upon UL SRS. The UL PRS transmission allows unique UE Identification such that listening device (or RP) can decode/identify the UE based upon transmitted reference signal. In UL, when UE transmits the UL Reference signal (e.g., UL SRS or UL PRS), the gNB shall be able to identify the UE. The proposed UL SRS or UL PRS sequence generation is to be used when a UE in inactive state transmits UL SRS or UL PRS.

Currently, as disclosed in 3GPP TS 38.331 v 16.4.0, the UE ID can be represented by:

```
InitialUE-Identity ::=        CHOICE {
    ng-5G-S-TMSI-Part1            BIT STRING (SIZE (39)),
    randomValue                   BIT STRING (SIZE (39))
}
```

| InitialUE-Identity field descriptions |
|---|
| ng-5G-S-TMSI-Part1<br>The rightmost 39 bits of 5G-S-TMSI.<br>randomValue<br>Integer value in the range 0 to $2^{39} - 1$. |

However, such ID cannot be used for UE positioning purpose as it will violate the security and privacy needs.

As such, according to certain embodiments, the AMF allocates a unique ID per UE from current sequence ID (1 to 65535) to each gNB. The gNB will use this ID to assign to the UE for UL SRS (or UL PRS) sequence generation. AMF maintains the mapping of UE TMSI and the sequence ID or SRS ID. Considering that, for IIOT environment, there are not more than 65535 UEs, these ID may suffice.

Further, in a particular embodiment, the IDs can be made cell bound. That is, as long as a UE is in a cell, the ID is valid, and the UE always uses that ID to generate the UL SRS or UL PRS sequence that is to be used for UL SRS or UL PRS transmission. When the UE does cell reselection (i.e., selects another cell), it will then go to connected mode and notify that gNB so that the ID is freed.

According to certain embodiments, the unique ID can be used for mitigating interference. For example, higher layer signaling may be used for coordinating interference suppression for Inactive mode UL SRS/UL PRS transmission. As such, in a particular embodiment listening devices (or RPs) may report the UE ID (e.g., SRS ID, UL PRS ID, or Sequence ID) to LMF along with gNB Rx−Tx and RSRP. The LMF then coordinates with serving gNB and listening gNB to evaluate interference. LMF then informs AMF or gNB to page the UE. The serving gNB operates to reconfigure UL SRS or redirect the UE to some other cell/frequency.

According to certain embodiments, the network (i.e., a network node such as a gNB) may broadcast the appropriate TA value to be used for UL transmission based upon which TRP has the best transmission.

Although RRC inactive mode is mentioned in the certain of the above described embodiments, the embodiments are non-limiting and are also applicable in RRC Idle mode.

In some embodiments, UL resource(s) to be used for UL SRS (or UL PRS) in inactive and idle modes are predefined in specifications and the UE's transmitting UL SRS (or UL PRS) in inactive or idle modes use these predefined resources for UL SRS (or UL PRS) transmission. The preconfigured UL resources may include one or more of the following:

- one or more slot(s) in which the UL resource(s) are defined,
- one or more symbols within the slot(s),
- a Comb number to be used for UL SRS (or UL PRS) transmission, where the comb number $K_{TC}$ defines the UL SRS (or UL PRS) transmission in every $$K_{TC}^{th}$$

subcarrier (see 3GPP TS 38.211), and/or

- a cyclic shift $\alpha_i$ for UL SRS (or UL PRS) as defined in TS 38.211.

According to certain embodiments, the UL resources are configured by the serving gNB t when the UE is in active mode. Then, the UE can use the configured UL resource for UL SRS (or UL PRS) transmission in inactive or idle mode. For example, the serving gNB sends the configured UL resources to the LMF. The LMF then sends the configured UL resources to the neighbouring gNBs so that the neighbouring gNBs are aware of the UL resources in which the UE will send UL SRS or UL PRS. In a particular embodiment, the UL resources are associated with the SRS sequence ID and/or UE ID.

In a particular embodiment, the UL resource consists of a single symbol per slot. For example, the UL resource may consist of a last symbol, in a particular embodiment.

Figure 3:
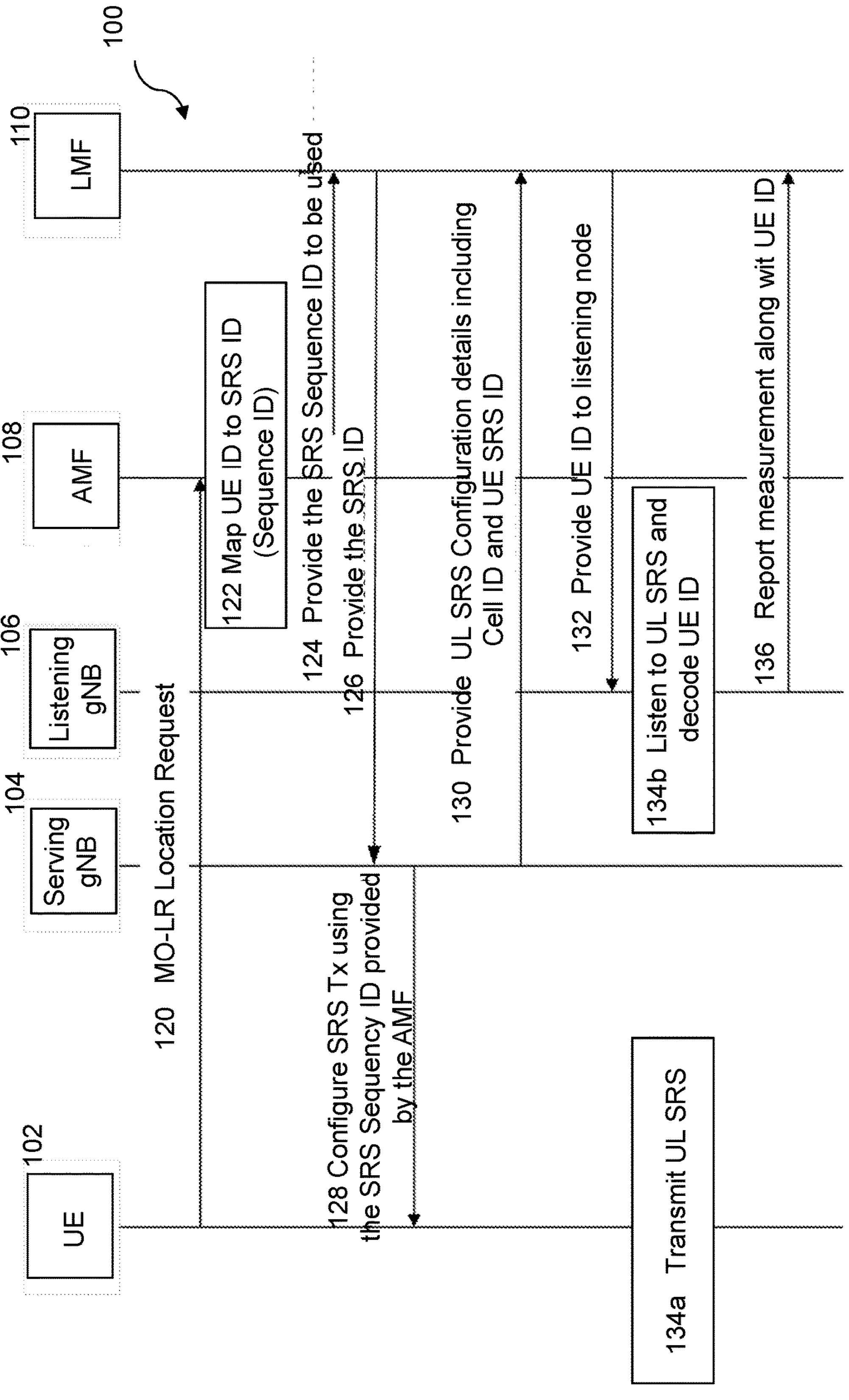
FIG. 3 illustrates a signaling diagram depicting an example method, according to certain embodiments.

FIG. 3 illustrates a signaling diagram 100 depicting an example method, according to certain embodiments. As depicted, the signaling is between a UE 102, a serving gNB 104, listening gNB 106, AMF 108, and LMF 110.

At step 120, the AMF 108 receives a location request from a client in UE 102 or from external client such as GMLC. In FIG. 3, for simplification, GMLC has been removed. At step 122, the AMF 108 checks the cell ID from where the UE 102 has sent the request and performs a mapping between the UE ID and SRS Sequence ID. An example mapping is shown in Table 1 below. Although SRS sequence ID is shown in the example, similar sequence ID mapping rules may also be performed between the UE ID and an UL PRS sequence ID.

TABLE 1

| | UE ID (e.g. TMSI, IMSI) | SRS Sequence ID |
|---|---|---|
| Cell ID A | TMSI X | 500 |
| | TMSI Y | 800 |
| | TMSI Z | 911 |

At step 124, the AMF 108 provides the SRS sequence ID per UE 102. The SRS sequence ID can be used by a particular UE 102 for UL SRS transmission to LMF 110. Alternatively, the AMF 108 may also provide the SRS sequence ID to gNB 104 directly or LMF 110 can provide this to gNB 104 via NRPPa. The mapping of UE-Id to SRS-id is a service in AMF 108 that is exposed to the serving gNB 104 & listening gNB 106.

At step 126, the serving gNB 104 configures the UL SRS using the sequence ID. At step 128, the serving gNB 104 informs the UE 102 of the configured UL SRS configuration and the sequence ID used to LMF 110. The serving gNB 104 provides UL SRS configuration details including the Cell ID and the UE SRS ID to the LMF 110, at step 130.

At step 132, the LMF 110 informs the listening gNB 106 that a UE 102 with the sequence ID "500" has been configured to transmit from cell "A".

At step 134*a*, the UE 102 transmits UL SRS using a unique signature of the sequence ID "500". The listening nodes 106 decode the UL SRS and identify the UE ID and perform measurements, at step 134*b*.

At step 136, the listening nodes 106 provide the measurement result to the LMF 110 for location estimation.

According to certain embodiments, step 128 happens when the UE 102 is in RRC active mode. Step 134*a* may happen when the UE 102 is in either RRC inactive or idle mode.

One of the challenges is for the listening node 106 to be able to identify which UE 102 is transmitting at step 134*b*. As per current Specification, the time instance that is provided corresponds with when the UE 102 is going to transmit. The LMF 110 provides this and other details to listening nodes 106. However, this results in a massive amount of signaling. Additionally, while in inactive mode, it is unpredictable as which listening nodes 106 are the best. Thus, the LMF 110 may only notify the active UE IDs that are configured for transmission and when, in particular instance, the UE transmit is not known to the listening nodes. The listening nodes 106 perform energy detection to see if any UE 102 transmits anything in UL. When such signals are detected, the UE decodes the signal and identifies the sequence ID.

After the positioning session is over or if the UE 102 happens to select another cell, the mapping between UE ID and SRS sequence ID is released by AMF 108. AMF 108 may get notified by LMF 110 or serving gNB 104 that UE 102 has changed cell.

If UE 102 happens to select a new cell, it may perform RRC Resume and notify the serving gNB 104 to release the current ID and provide a new ID for UL SRS transmission. This will also enable fast reconfiguration of UL SRS in inactive mode.

Further, according to certain embodiments, AMF 108 may also provide mapping so that the SRS IDs are applicable to multiple cells or one Radio Network Area (RNA). This would depend upon whether 65,535 IDs would be enough or not for RNA.

Figure 4:
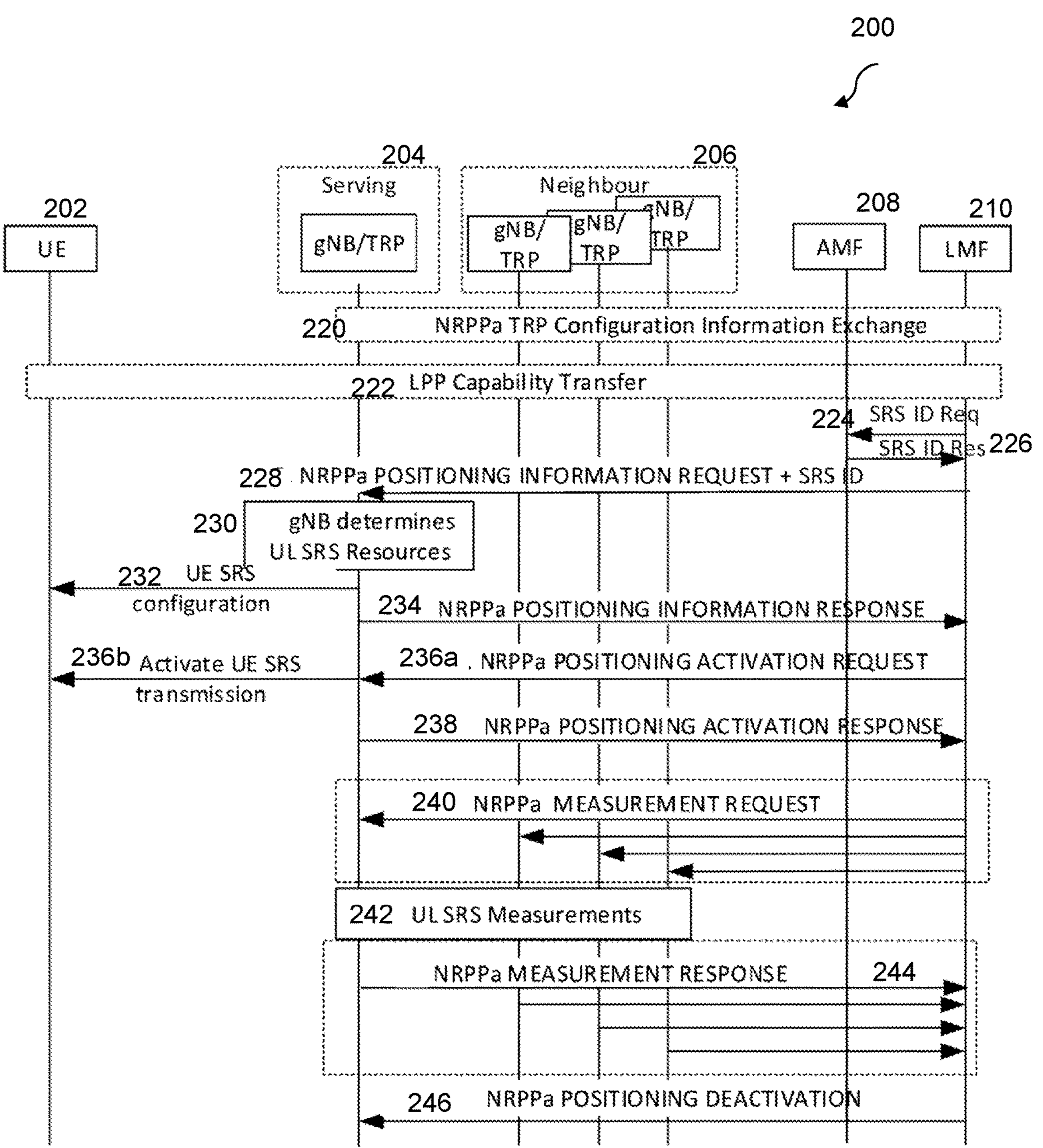
FIG. 4 illustrates a signaling diagram depicting another example method, according to certain embodiments.

FIG. 4 illustrates a signaling diagram 200 that depicts another example method, according to certain embodiments. As depicted, the signaling is between a UE 202, a serving gNB/TRP 204, multiple neighbor gNB/TRPs 206, AMF 308, and LMF 210. The base line is UL UTDOA procedure from 3GPP TS 38.305 v 16.4.0. Thus, description for steps 220-222 and 228-246 is discussed in more detail in 3GPP TS 38.305 v 16.4.0. However, new signaling has been added at steps 224 and 226. Specifically, as depicted in FIG. 4, if LMF 210 decides to invoke positioning method that involves UL SRS, the LMF 210 may request AMF 208 to provide the SRS ID for the UE 202, at step 224.

The mapping of UE-Id to SRS-id is a service performed in AMF 208 that is exposed to serving & listening gNBs (Reception points) 204-206, according to certain embodiments.

The AMF 208 may then provide, at step 226, an ID to the LMF 210. The LMF 210 then provides the ID to the serving node 204, at step 228.

At step 232, the serving gNB 204 configures the UL SRS using the provided ID and confirms to the LMF 210.

PRACH Based

Another approach to have UE specific UL Transmission is to define positioning specific preambles. Thus, according to certain embodiments, certain preambles may be reserved only for positioning purpose(s). In a particular embodiment, the preamble resource group may be partitioned so that the group is reserved for positioning.

In another embodiment, a new PRACH UL signal is defined. The new PRACH UL signal is still based upon Zadoff-Chu sequence but is reserved for positioning purposes.

According to certain embodiments, each UE then performs UL transmission using the UE's preamble. The gNB can uniquely identify the UE based upon the preamble used. LMF may co-ordinate the transmission with the listening nodes based upon RA-RNTI.

3GPP TS 38.32 discloses:

The RA-RNTI associated with the PRACH occasion in which the Random Access Preamble is transmitted, is computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion ($0 \le s\_id < 14$), t_id is the index of the first slot of the PRACH occasion in a system frame ($0 \le t\_id < 80$), where the subcarrier spacing to determine t_id is based on the value of u specified in clause 5.3.2 in TS 38.211 [8], f_id is the index of the PRACH occasion in the frequency domain ($0 \le f\_id < 8$), and ul_carrier_id is the UL carrier used for Random Access Preamble transmission (0 for NUL carrier, and 1 for SUL carrier).

The drawback would be that there are only 64 preambles and hence not more than 64 UEs could be configured for PRACH based positioning from a cell.

Figure 5:
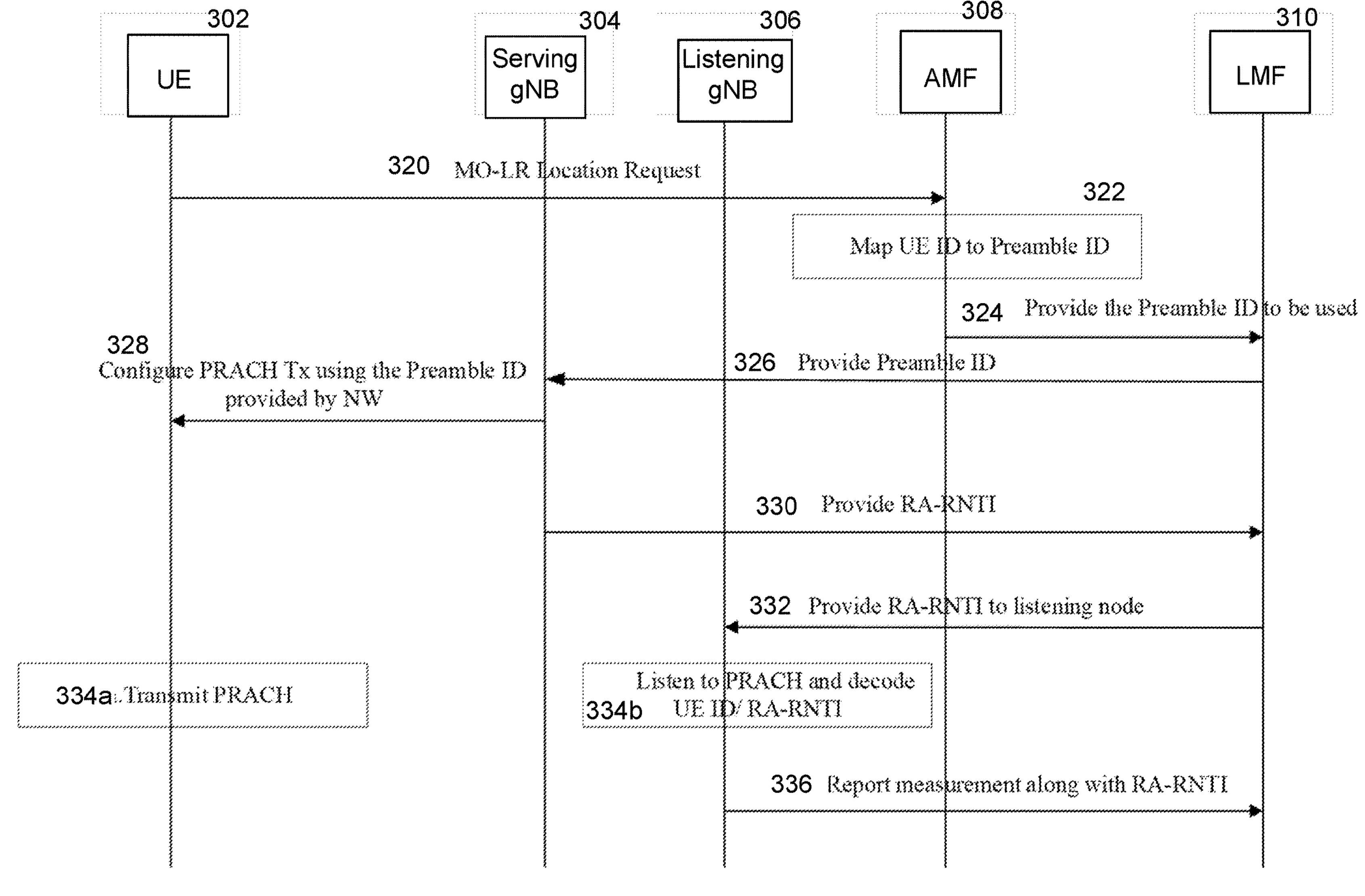
FIG. 5 illustrates a high level sequence diagram for PRACH-based UE specific UL transmission, according to certain embodiments.

FIG. 5 illustrates a high level sequence diagram 300 for PRACH-based UE specific UL transmission, according to certain embodiments. As depicted, the signaling is between a UE 302, a serving gNB 304, a listening gNB 306, AMF 308, and LMF 310.

At step 320, the UE 302 sends a MO-LR Location Request to AMF 308. The AMF 308 then maps the UE ID to a preamble ID, at step 322.

At step 324, the AMF 308 provides the Preamble ID to be used to the LMF 310.

At step 326, the LMF 310 provides the Preamble ID to serving gNB 304.

At step 328, the serving gNB 304 configure PRACH Tx using the Preamble ID provided by the network.

At step 330, the serving gNB 304 provides the RA-RNTI to the LMF 310.

At step 332, the LMF 310 provides RA-RNTI to listening node 306.

At step 334*a*, the UE 302 transmits PRACH.

At step 334*b*, the listening gNB 306 listens to PRACH and decodes the UE ID/RA-RNTI.

At step 336, the listening gNB 306 reports measurements along with RA-RNTI.

Figure 6:
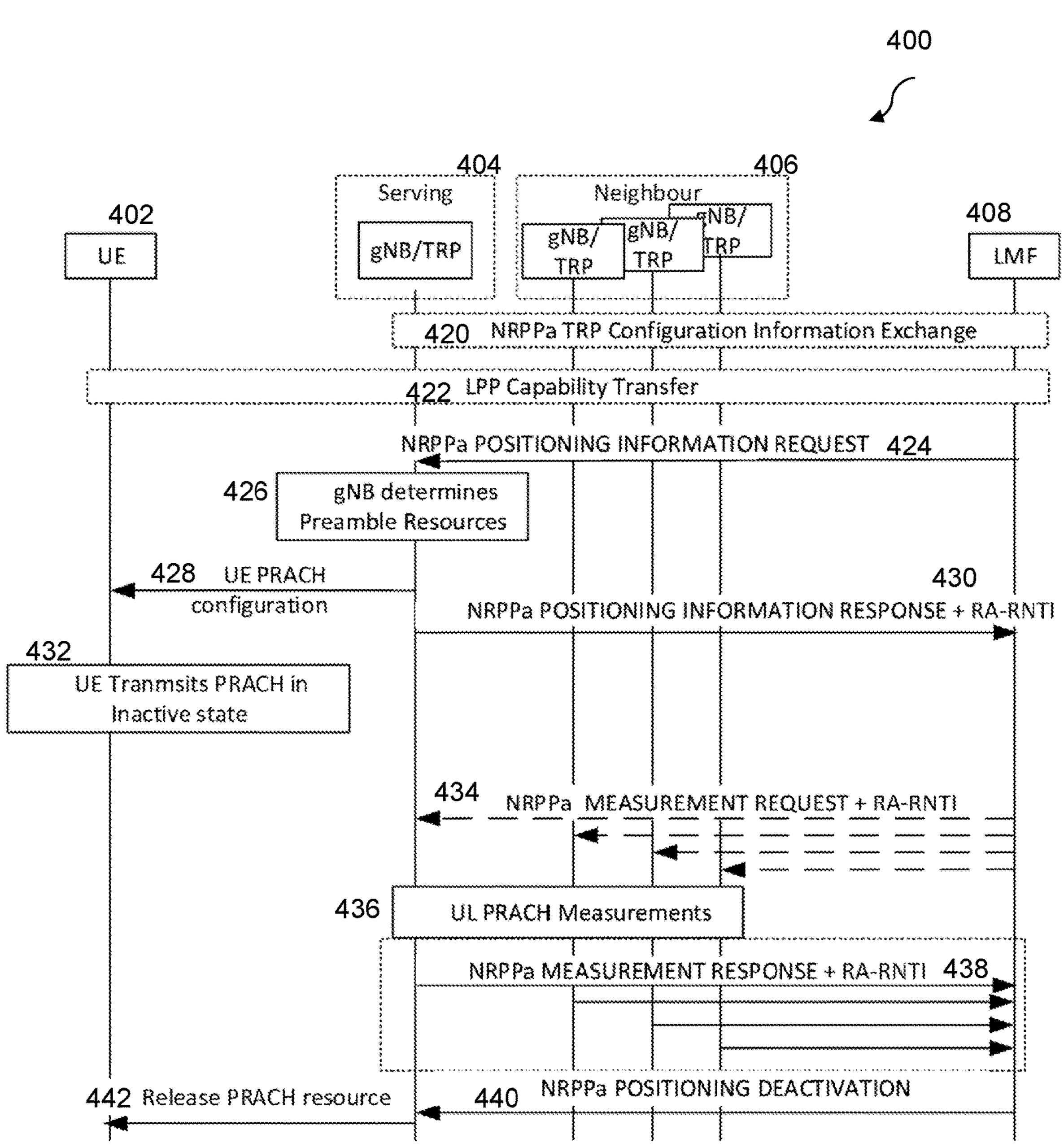
FIG. 6 illustrates a sequence diagram that shows that preamble resources for positioning is being managed by secured core network node such as AMF, according to certain embodiments.

FIG. 6 illustrates a sequence diagram 400 that shows that preamble resources for positioning being managed by secured core network node such as AMF, according to certain embodiments. However, in some cases, it could be that gNB may also be given such task. In such case, LMF may obtain the RA-RNTI from the gNB. As depicted, the signaling is between a UE 402, a serving gNB 404, neighbor gNBs/TRPs 406, and LMF 410.

The base line for the UL TDOA procedure is 3GPP TS 38.305 v. 16.4.0. Thus, description for certain of steps 420-442 are discussed in more detail in 3GPP TS 38.305 v 16.4.0. However, new signaling and features have been added at steps 426, 428, 430, 432, 434, 436, and 442.

Specifically, steps 420-422 include a request from LMF 408 to enable UL PRACH transmission from the UE 402. At step 426 and 428, gNB 404 determines and allocates one of the reserved preamble for positioning to the UE 402. At step 30, the RA-RNTI based upon that preamble resource is provided to the LMF 408. At step 432, the UE 402 transmits in UL using the provided UL PRACH resource. At step 434, the Listening node perform the measurement as in step 436. In certain embodiments, step 434 could be optional. At step, the Listening node 406 provides, to LMF 408, the measurement result for the particular detected UE 402 having a particular RA-RNTI. Upon receiving deactivation message, serving gNB 404 may send message "release the PRACH resource" to the UE, at step 442.

Figure 7:
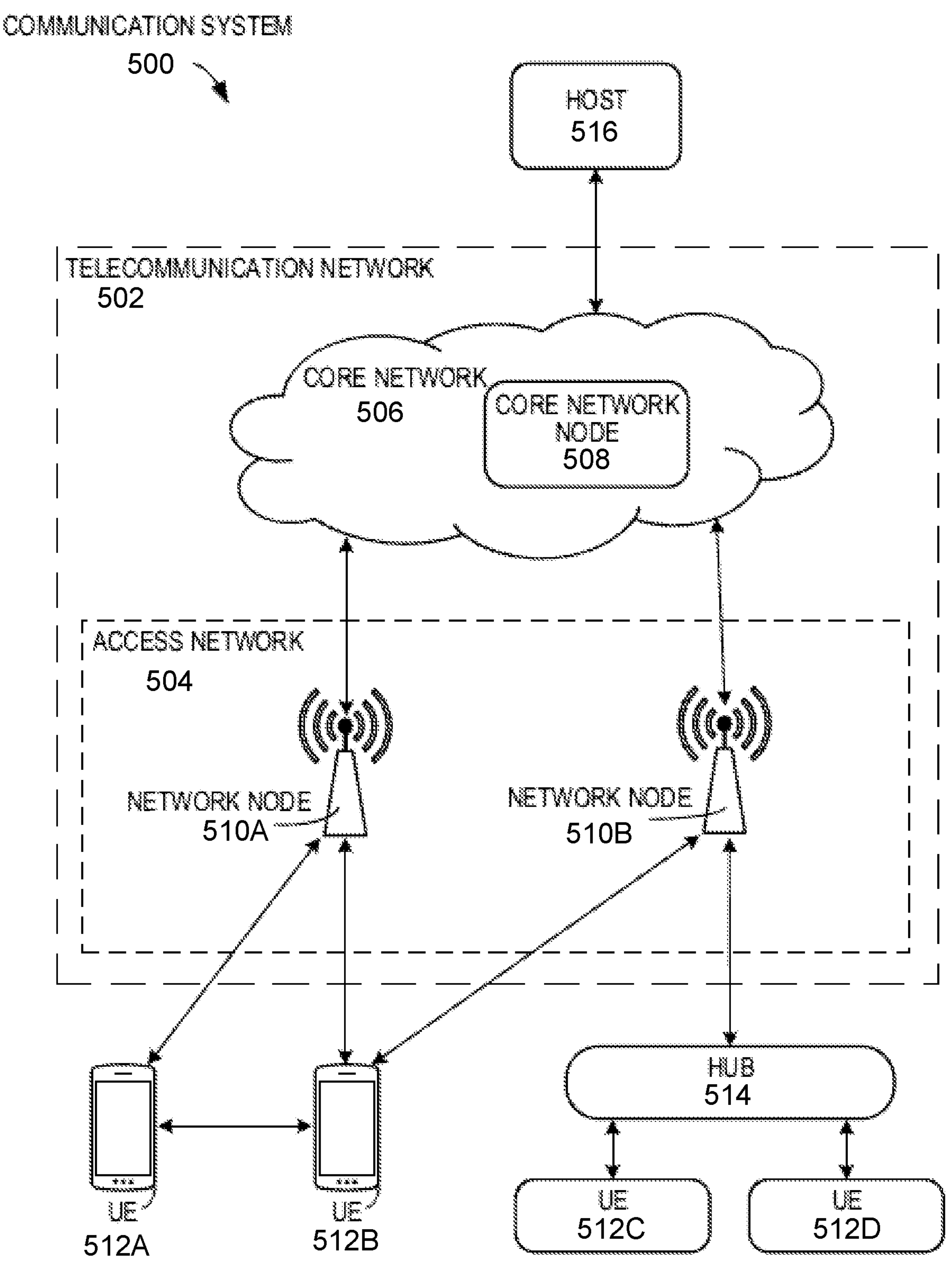
FIG. 7 illustrates an example communication system, according to certain embodiments.

FIG. 7 shows an example of a communication system 500 in accordance with some embodiments. In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar 3$^{rd}$ Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub—that is, a device which is capable of operating to route communications between the UEs and network node 510*b*, but which is additionally capable of operating as a communication start and/or end point for certain data channels.

Figure 8:
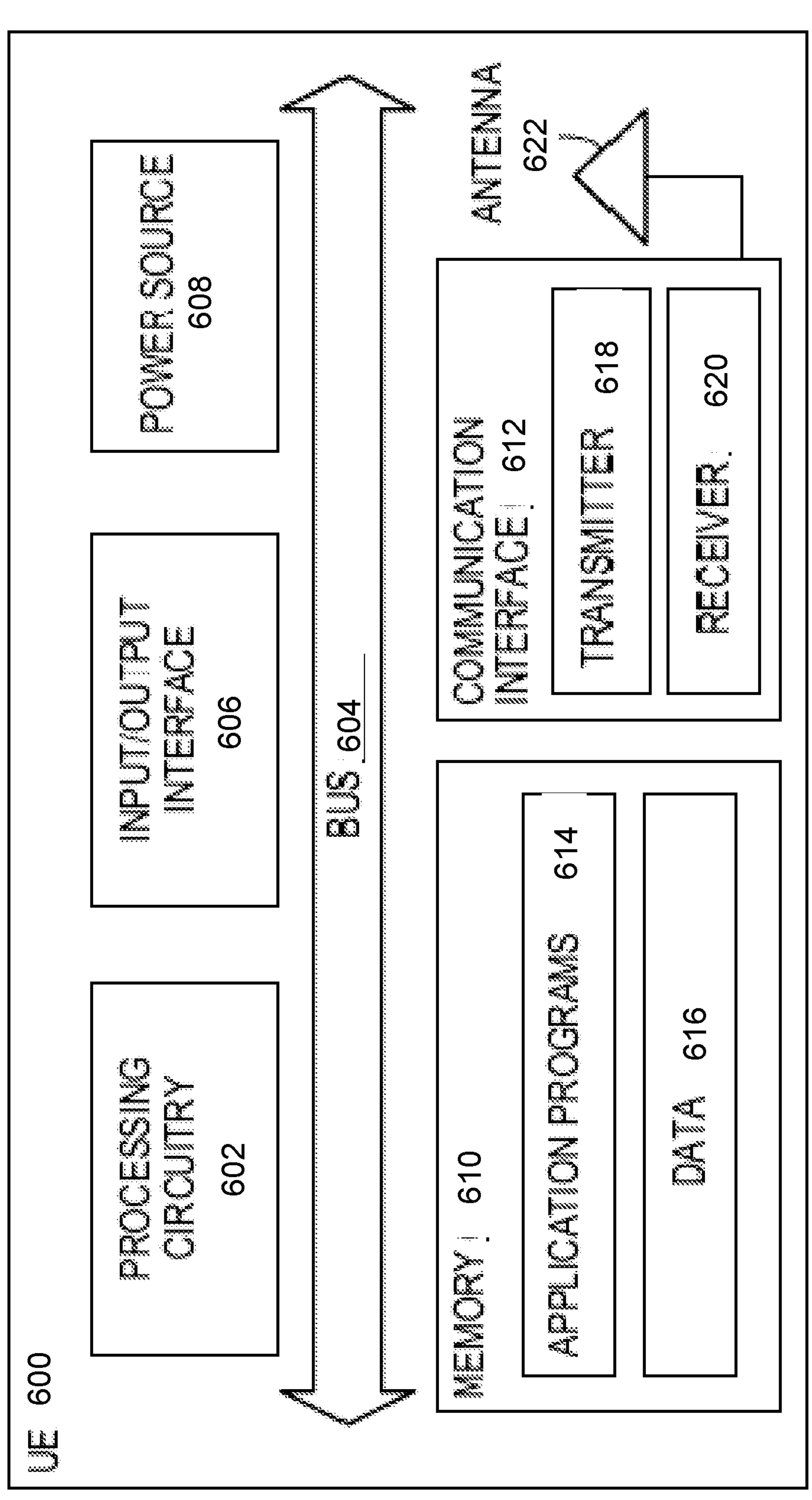
FIG. 8 illustrates an example UE, according to certain embodiments.

FIG. 8 shows a UE 600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 602 may include multiple central processing units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
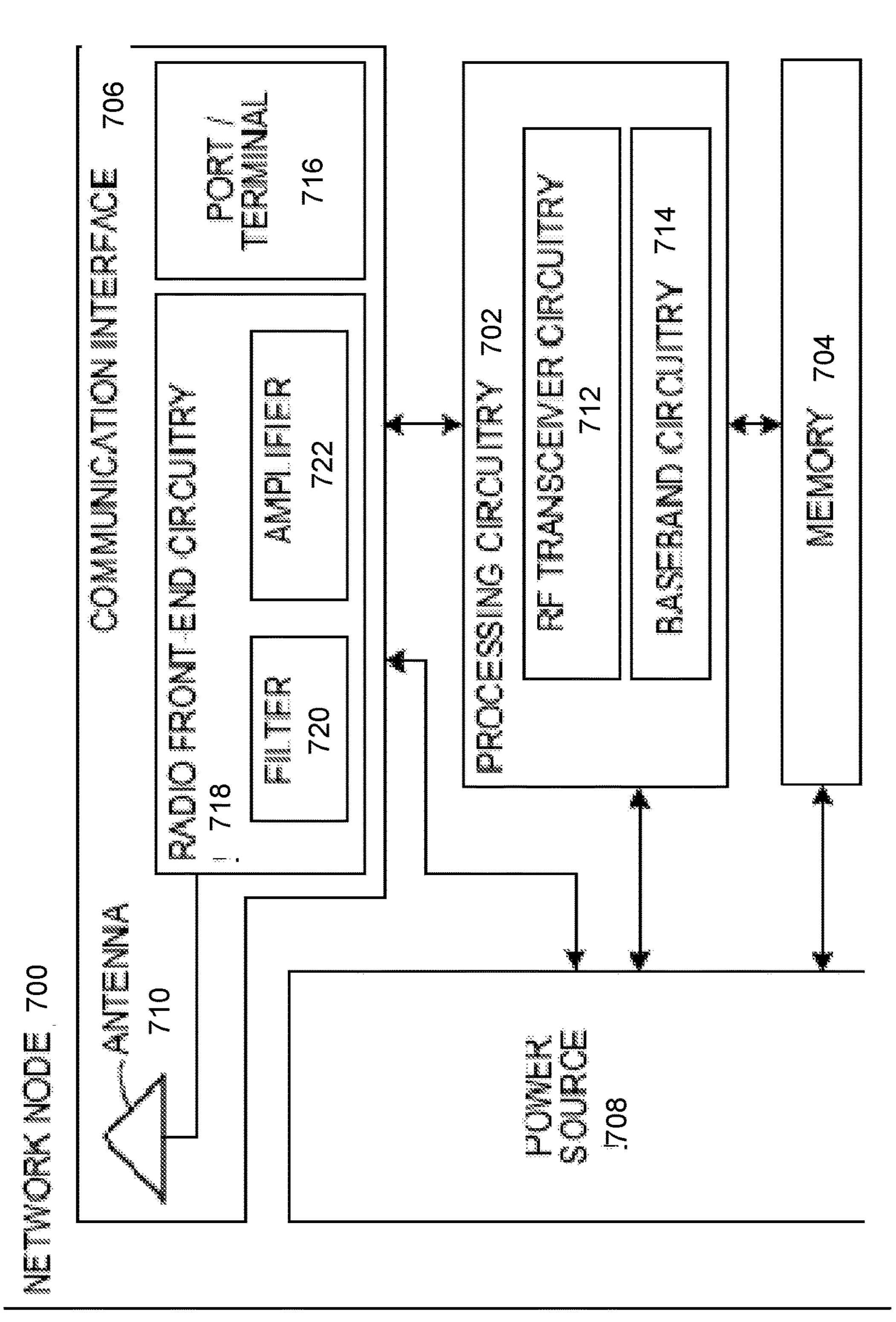
FIG. 9 illustrates an example network node, according to certain embodiments.

FIG. 9 shows a network node 700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, NodeBs, evolved NodeBs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 10:
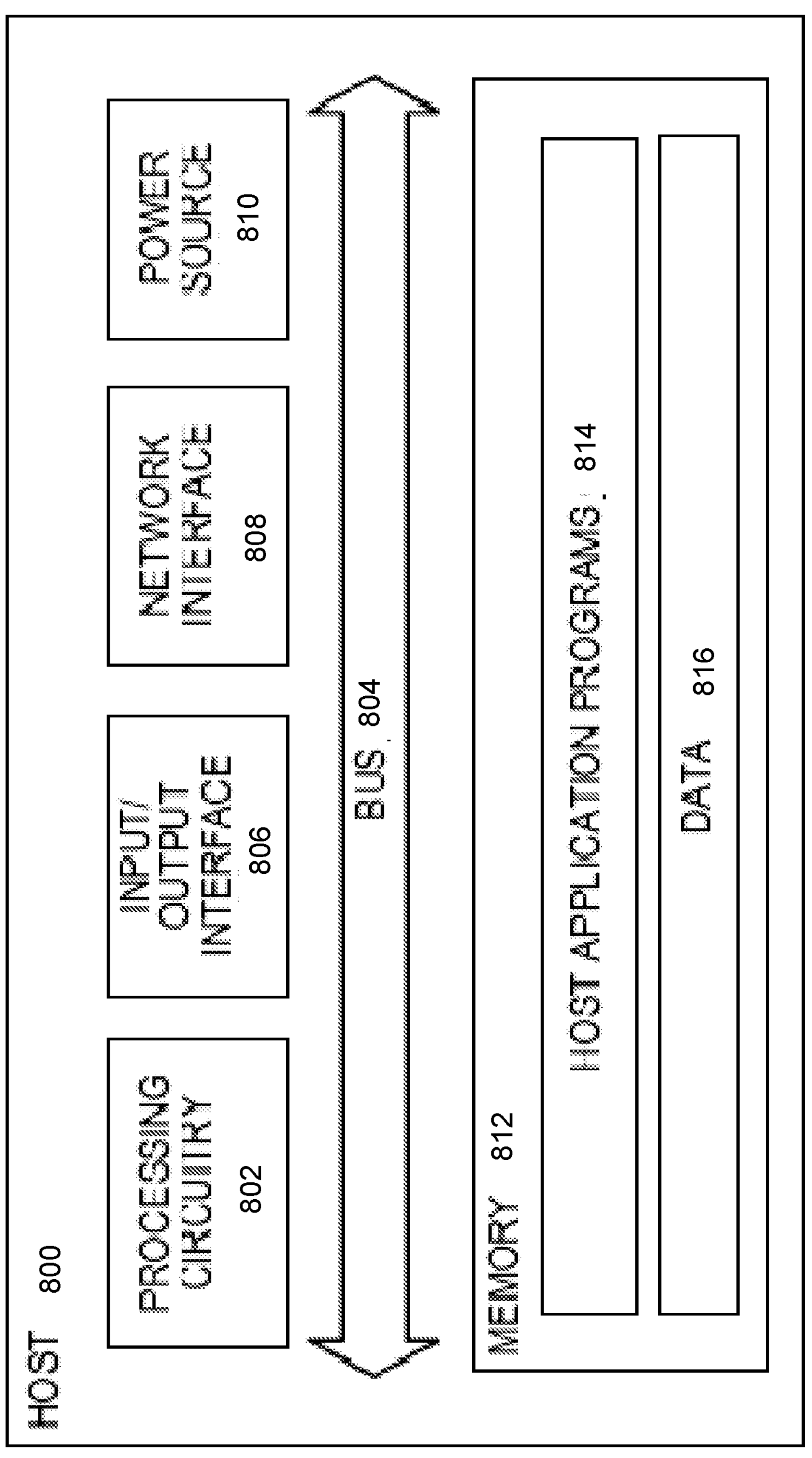
FIG. 10 illustrates a block diagram of a host, according to certain embodiments.

FIG. 10 is a block diagram of a host 800, which may be an embodiment of the host 516 of FIG. 5, in accordance with various aspects described herein. As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially similar to those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
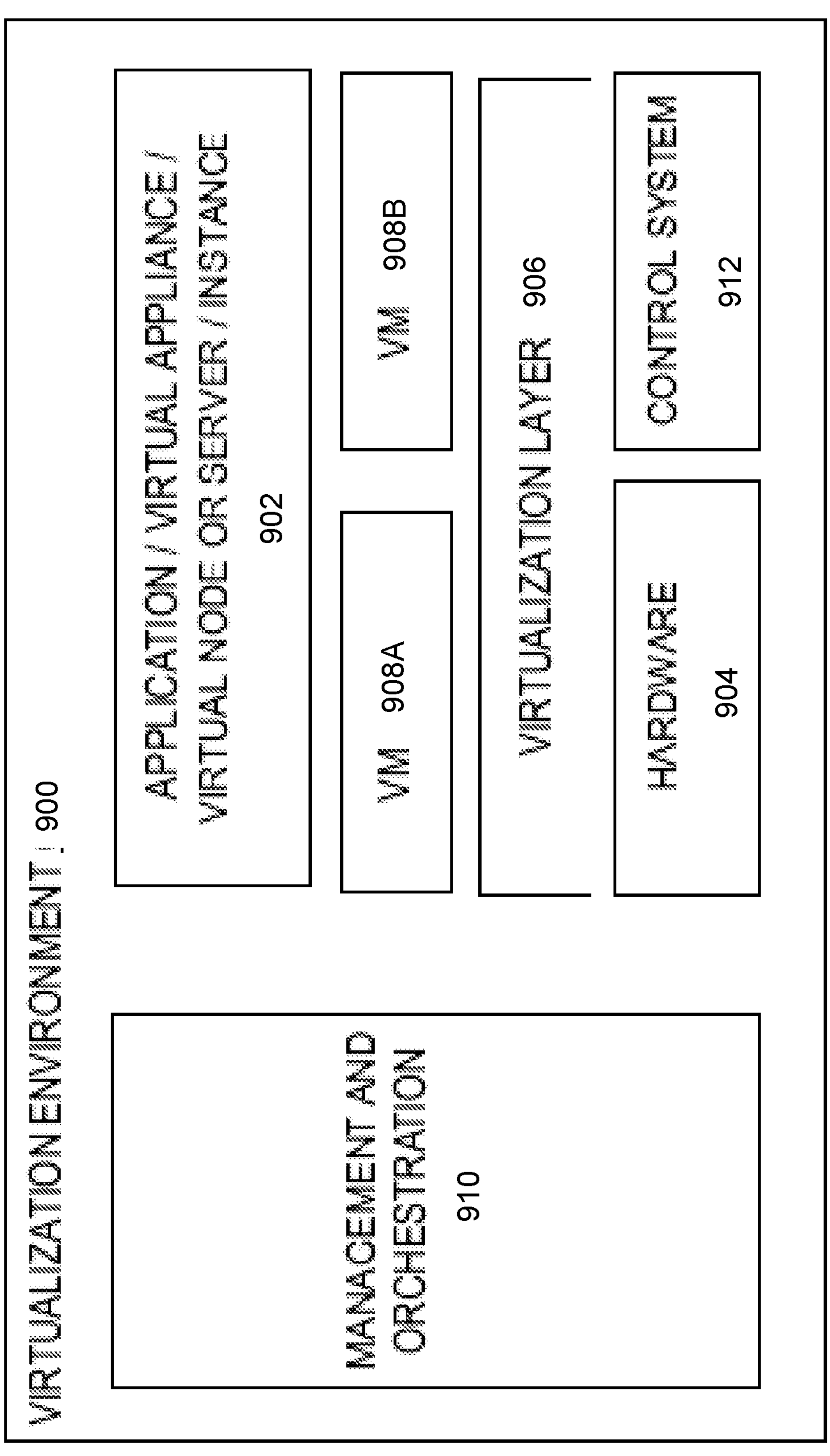
FIG. 11 illustrates a virtualization environment in which functions implemented by some embodiments may be virtualized, according to certain embodiments.

FIG. 11 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908*a* and 908*b* (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 12:
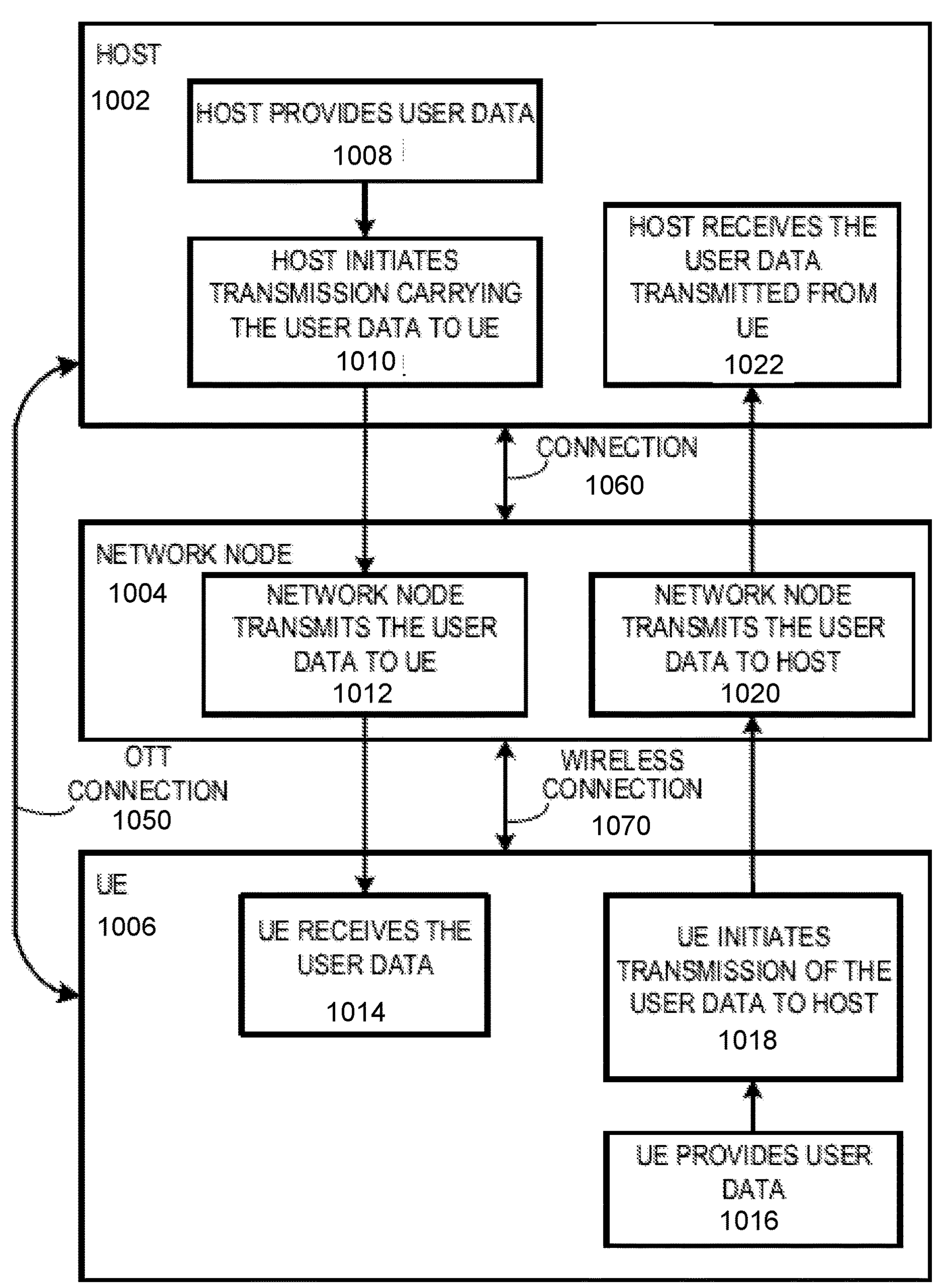
FIG. 12 illustrates a host communicating via a network node with a UE over a partially wireless connection, according to certain embodiments.

FIG. 12 shows a communication diagram of a host 1002 communicating via a network node 1004 with a UE 1006 over a partially wireless connection in accordance with some embodiments.

Example implementations, in accordance with various embodiments, of the UE (such as a UE 512*a* of FIG. 5 and/or UE 600 of FIG. 6), network node (such as network node 510*a* of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment. More precisely, the teachings of these embodiments may improve one or more of, for example, data rate, latency, and/or power consumption and, thereby, provide benefits such as, for example, reduced user waiting time, relaxed restriction on file size, improved content resolution, better responsiveness, and/or extended battery lifetime.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes; the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

FIG. 13 illustrates a method 1100 by a UE 512 for unique identification of the UE 512 for positioning, according to certain embodiments. The method includes, at step 1102, transmitting, to a network node 510, an uplink signal that is generated based on a unique identifier associated with the UE 512 or that uses a preamble that is reserved for positioning.

In a particular embodiment, the UE receives the unique identifier from a network node 510 that comprises a gNB or an AMF and generates the uplink signal based on a unique identifier associated with the UE 512 and/or using a preamble that is reserved for positioning.

In a particular embodiment, the unique identifier is mapped to a TMSI or IMSI associated with the UE 512.

In a particular embodiment, the unique identifier comprises a sequence identifier, a sounding reference signal identifier, or a positioning reference signal identifier.

In a particular embodiment, the uplink signal comprises a sounding reference signal or a positioning reference signal.

In a particular embodiment, the unique identifier is associated with a spatial domain that comprises a cell and/or a radio network area.

In a particular embodiment, the UE 512 receives, from an AMF or a network node 510, a message that indicates the UE 512 is to move to another cell or frequency.

In a particular embodiment, the UE 512 is in a low power state.

In a particular embodiment, the low power state comprises a RRC inactive mode or a RRC idle mode.

In a particular embodiment, the UE 512 performs a connection resume procedure to transition to an active state and transmits, to a network node 510, a message indicating that the unique identifier may be released.

In a particular embodiment, the uplink signal is transmitted using at least one preconfigured uplink resource that is associated with the unique identifier, and the at least one preconfigured uplink resource being received from the network node 510. Further, the at least one preconfigured uplink resource comprising at least one of: one or more slots in which the at least one preconfigured uplink resource is defined; one or more symbols within a slot(s); a Comb number to be used for transmission of the uplink signal; and a cyclic shift $\alpha_i$ for the uplink signal.

In a particular embodiment, the uplink signal comprises a PRACH uplink signal and the preamble is reserved to a preamble resource group for positioning purposes.

FIG. 14 illustrates a method 1200 by a first network node 510 comprising a gNodeB and/or a listening node, according to certain embodiments. The method includes detecting an uplink signal associated with a UE 512, at step 1202. The uplink signal comprises a unique identifier or a preamble reserved for positioning. Based on the unique identifier or the preamble reserved for positioning, the first network node 510 identifies the UE 512 associated with the uplink signal, at step 1204. In response to identifying the UE 512 associated with the uplink signal, the first network node 510 performs at least one positioning operation associated with the UE 512, at step 1206.

In a particular embodiment, when performing the at least one positioning operation, the first network node 510 performs at least one of: transmitting, to a second network node, a measurement report for the UE 512; determining that the UE 512 is associated with and/or causing interference; transmitting, to the UE 512, a signal to trigger the UE 512 to transition to a connected mode; and adapting a configuration of the UE 512 and transmitting the adapted configuration to the UE 512.

In a particular embodiment, prior to receiving the uplink signal, the first network node 510 comprises at least one of: receiving the unique identifier from a second network node operating as a LMF, and transmitting the unique identifier to the UE 512.

In a particular embodiment, the unique identifier is mapped to a TMSI or IMSI associated with the UE 512.

In a particular embodiment, the uplink signal comprises a SRS or a PRS.

In a particular embodiment, the unique identifier comprises a sequence identifier, a SRS ID or a PRS ID.

In a particular embodiment, the unique identifier is associated with a spatial domain comprising a cell and/or a radio network area.

In a particular embodiment, when performing the at least one positioning operation, the first network node 510 transmits, to the UE 512, a message that indicates the UE 512 is to move to another cell or frequency.

In a particular embodiment, the UE 512 is in a low power state.

In a particular embodiment, the low power state comprises a RRC inactive mode or a RRC idle mode.

In a particular embodiment, the uplink signal is received in or associated with at least one preconfigured uplink resource, and the at least one preconfigured uplink resource is associated with the unique identifier. The at least one preconfigured uplink resource comprises at least one of: one or more slots in which the at least one preconfigured uplink resource is defined; one or more symbols within a slot; a Comb number used for transmission of the uplink signal by the UE 512; and a cyclic shift $\alpha_i$ for the uplink signal.

In a particular embodiment, the first network node 510 transmits, to the UE 512, the at least one preconfigured uplink resource while the UE 512 is in an active mode.

In a particular embodiment, the first network node 510 receives, from the UE 512, a message indicating that a unique identifier may be released after the UE 512 transitions to a connected state or active mode.

In a particular embodiment, the uplink signal comprises a PRACH uplink signal and the preamble is reserved to a preamble resource group for positioning purposes.

In a particular embodiment, the first network node 510 maps the unique identifier associated with the UE 12 to a sequence identifier.

Figure 15:
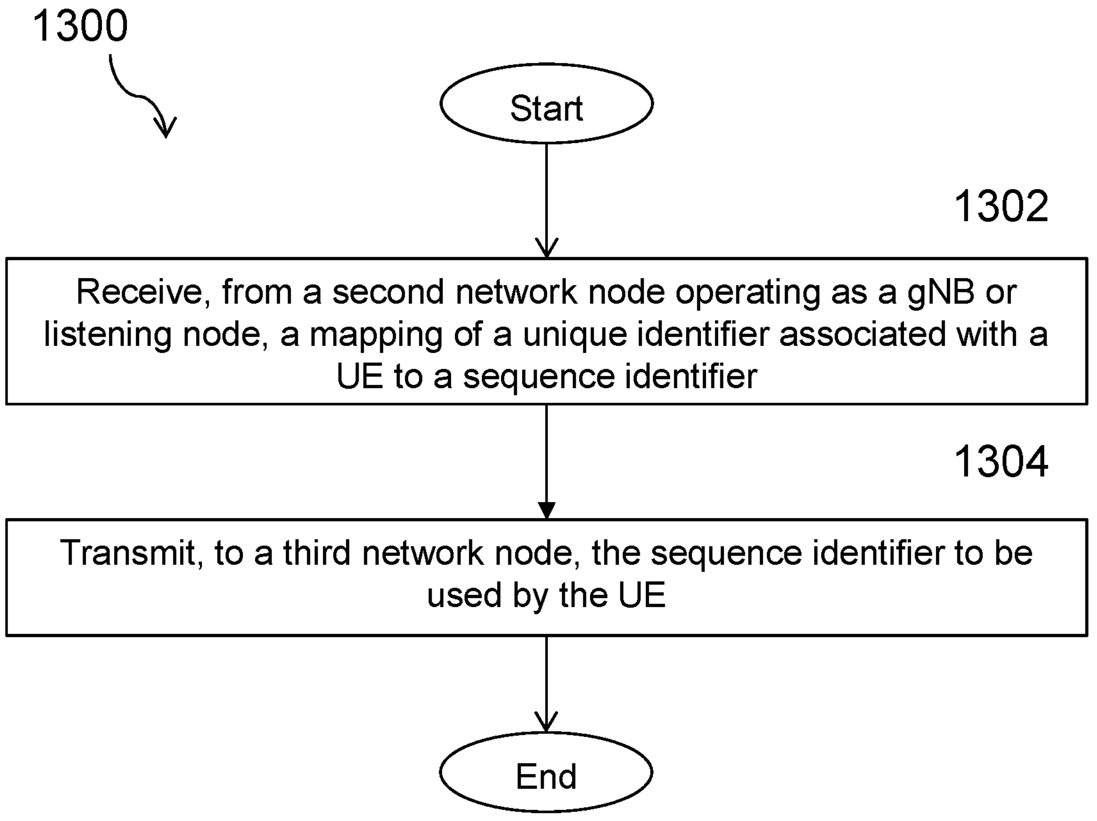
FIG. 15 illustrates a method by a core network node operating as a LMF, according to certain embodiments.

FIG. 15 illustrates a method 1300 by a core network node 508 operating as a LMF, according to certain embodiments. The method includes receiving, from a second network node 512A-512B operating as a gNodeB or listening node, a mapping of a unique identifier associated with a UE 510A-510D to a sequence identifier, at step 1302. At step 1304, the core network node 508 transmits, to a third network node, the sequence identifier to be used by the UE.

In a particular embodiment, the core network node 508 receives, from the second network node (510) or another network node a measurement report for the UE 512.

In a particular embodiment, the UE 512 is associated with and/or causing interference.

In a particular embodiment, the sequence identifier comprises a SRS ID or a PRS ID.

In a particular embodiment, the unique identifier is associated with a spatial domain comprising a cell and/or a radio network area.

In a particular embodiment, the UE is in a low power state.

In a particular embodiment, the low power state comprises a RRC inactive mode or a RRC idle mode.

In a particular embodiment, the core network node 508 associates at least one preconfigured uplink resource with the UE, and the at least one preconfigured uplink resource comprising at least one of: one or more slot in which the at least one preconfigured uplink resource is defined; one or more symbols within a slot; a Comb number used for transmission of an uplink signal by the UE; and a cyclic shift $\alpha_i$ for an uplink signal.

In a particular embodiment, the at least one preconfigured uplink resource is associated with the unique identifier and/or the sequence identifier.

EXAMPLE EMBODIMENTS

Group A Example Embodiments

Example Embodiment A1. A method by a user equipment (UE) for unique identification of the UE for positioning, the method comprising: any of the user equipment steps, features, or functions described above, either alone or in combination with other steps, features, or functions described above.

Example Embodiment A2. The method of the previous embodiment, further comprising one or more additional user equipment steps, features or functions described above.

Example Embodiment A3. The method of any of the previous embodiments, further comprising: providing user data; and forwarding the user data to a host computer via the transmission to the network node.

Group B Example Embodiments

Example Embodiment B1. A method performed by a network node for unique identification of the UE for positioning, the method comprising: any of the network node steps, features, or functions described above, either alone or in combination with other steps, features, or functions described above.

Example Embodiment B2. The method of the previous embodiment, further comprising one or more additional network node steps, features or functions described above.

Example Embodiment B3. The method of any of the previous embodiments, further comprising: obtaining user data; and forwarding the user data to a host or a user equipment.

Group C Example Embodiments

Example Embodiment C1. A method by a user equipment (UE) for unique identification of the UE for positioning, the method comprising: generating an uplink signal based on a unique identifier associated with the UE and/or using a preamble that is reserved for positioning; and transmitting the uplink signal that is generated based on the unique identifier associated with the UE and/or that uses the preamble that is reserved for positioning.

Example Embodiment C2. The method of Example Embodiment C1, further comprising receiving the unique identifier from a network node such as, for example, a gNodeB or an Application Management Function (AMF).

Example Embodiment C3. The method of any one of Example Embodiments C1 to C2, wherein the unique identifier is mapped to a TMSI associated with the UE.

Example Embodiment C4. The method of any one of Example Embodiments C1 to C3, wherein the unique identifier comprises a sequence ID or an sounding reference signal identifier (SRS ID) or a positioning reference signal identifier (PRS ID).

Example Embodiment C5. The method of any one of Example Embodiments C1 to C4, wherein the uplink signal comprises a sounding reference signal (SRS).

Example Embodiment C6. The method of any one of Example Embodiments C1 to C5, wherein the uplink signal comprises a positioning reference signal (PRS).

Example Embodiment C7. The method of any one of Example Embodiments C1 to C6, wherein the unique identifier is associated with a spatial domain.

Example Embodiment C8. The method of Example Embodiment C7, wherein the spatial domain comprises a cell and/or radio network area.

Example Embodiment C9. The method of any one of Example Embodiments C1 to C8, further comprising receiving a message that indicates the UE is to move to another cell or frequency.

Example Embodiment C10. The method of any one of Example Embodiment C9, wherein the message is a page received from an AMF.

Example Embodiment C11. The method of any one of Example Embodiments C1 to C10, wherein the UE is in a low power state.

Example Embodiment C12. The method of Example Embodiment C11, wherein the low power state comprises an RRC inactive mode or an RRC idle mode.

Example Embodiment C13. The method of any one of Example Embodiments C1 to C12, wherein the uplink signal is transmitted using at least one preconfigured uplink resource, the at least one preconfigured uplink resource comprising at least one of: One or more slot(s) in which the at least one preconfigured uplink resource is defined; One or more symbols within the slot(s); a Comb number to be used for transmission of the uplink signal; and a cyclic shift $\alpha_i$ for the uplink signal.

Example Embodiment C14. The method of Example Embodiment C13, further comprising receiving the at least one preconfigured uplink resource from a network node while in an active mode.

Example Embodiment C15. The method of any one of Example Embodiments C13 to C14, wherein the at least one preconfigured uplink resource is associated the unique identifier.

Example Embodiment C16. The method of any one of Example Embodiments C1 to C15, further comprising performing a connection resume procedure and transmitting, to a network node, a message indicating that the unique identifier may be released.

Example Embodiment C17. The method of any one of Example Embodiments C1 to C16, wherein the uplink signal comprises a PRACH uplink signal and wherein the preamble is reserved to a preamble resource group for positioning purposes.

Example Embodiment C18. The method of Example Embodiments C1 to C17, further comprising: providing user data; and forwarding the user data to a host via the transmission to the network node.

Example Embodiment C19. A user equipment comprising processing circuitry configured to perform any of the methods of Example Embodiments C1 to C18.

Example Embodiment C20. A wireless device comprising processing circuitry configured to perform any of the methods of Example Embodiments C1 to C18.

Example Embodiment C21. A computer program comprising instructions which when executed on a computer perform any of the methods of Example Embodiments C1 to C18.

Example Embodiment C22. A computer program product comprising computer program, the computer program comprising instructions which when executed on a computer perform any of the methods of Example Embodiments C1 to C18.

Example Embodiment C23. A non-transitory computer readable medium storing instructions which when executed by a computer perform any of the methods of Example Embodiments C1 to C18.

Group D Example Embodiments

Example Embodiment D1. A method by a first network node for identifying a user equipment (UE) associated with an uplink signal, the method comprising: detecting an uplink signal associated with the UE; and based on the uplink signal, determining the UE associated with the uplink signal; and in response to determining the UE associated with the uplink signal, performing at least one positioning operation associated with the UE.

Example Embodiment D2. The method of Example Embodiment D1, wherein the first network node comprises a gNodeB and/or a listening node.

Example Embodiment D3. The method of any one of Example Embodiments D1 to D2, wherein the first network node comprises and/or is operating as an Application Management Function.

Example Embodiment D4. The method of any one of Example Embodiments D1 to D3, wherein the uplink signal comprises a unique identifier, and wherein the UE is determined to be associated with the uplink signal based on the unique identifier.

Example Embodiment D5. The method of any one of Example Embodiments D1 to D4, wherein the uplink signal comprises a preamble reserved for positioning, and wherein the UE is determined to be associated with the uplink signal based on the preamble.

Example Embodiment D6. The method of any one of Example Embodiments D1 to D5, wherein performing the at least one positioning operation comprises transmitting, to a second network node a measurement report for the UE.

Example Embodiment D7. The method of any one of Example Embodiments D1 to D6, wherein performing the at least one positioning operation comprises determining that the UE is associated with and/or causing interference.

Example Embodiment D8. The method of any one of Example Embodiments D1 to D7, wherein performing the at least one positioning operation comprises transmitting, to the wireless device, a signal to trigger the UE to transition to a connected mode.

Example Embodiment D9. The method of any one of Example Embodiments D1 to D8, wherein performing the at least one positioning operation comprises adapting a configuration of the UE and transmitting the adapted configuration to the UE.

Example Embodiment D10. The method of any one of Example Embodiments D1 to D9, further comprising, prior to receiving the uplink signal, transmitting the unique identifier to the UE.

Example Embodiment D11. The method of any one of Example Embodiments D1 to D10, further comprising, prior to receiving the uplink signal, receiving the unique identifier from a second network node operating as a LMF.

Example Embodiment D12. The method of any one of Example Embodiments D1 to D11, wherein the unique identifier is mapped to a TMSI associated with the UE.

Example Embodiment D13. The method of any one of Example Embodiments D1 to D12, wherein the uplink signal comprises a sounding reference signal (SRS).

Example Embodiment D14. The method of any one of Example Embodiments D1 to D13, wherein the uplink signal comprises a positioning reference signal (PRS).

Example Embodiment D15. The method of any one of Example Embodiments D1 to D14, wherein the uplink signal comprises a unique identifier associated with the UE.

Example Embodiment D16. The method of Example Embodiment D15, wherein the unique identifier comprises a sequence ID or an sounding reference signal identifier (SRS ID) or a positioning reference signal identifier (PRS ID).

Example Embodiment D17. The method of any one of Example Embodiments D15 to D16, wherein the unique identifier is associated with a spatial domain.

Example Embodiment D18. The method of Example Embodiment D17, wherein the spatial domain comprises a cell and/or radio network area.

Example Embodiment D19. The method of any one of Example Embodiments D1 to D18, wherein performing the at least one positioning operation comprises transmitting, to the UE, a message that indicates the UE is to move to another cell or frequency.

Example Embodiment D20. The method of any one of Example Embodiment D19, wherein the message is a page.

Example Embodiment D21. The method of any one of Example Embodiments D1 to D20, wherein the UE is in a low power state.

Example Embodiment D22. The method of Example Embodiment D21, wherein the low power state comprises an RRC inactive mode or an RRC idle mode.

Example Embodiment D23. The method of any one of Example Embodiments D1 to D22, wherein the uplink signal is received in or associated with at least one preconfigured uplink resource, the at least one preconfigured uplink resource comprising at least one of: One or more slot(s) in which the at least one preconfigured uplink resource is defined; One or more symbols within the slot(s); a Comb number used for transmission of the uplink signal by the UE; and a cyclic shift $\alpha_i$ for the uplink signal.

Example Embodiment D24. The method of Example Embodiment D23, further comprising transmitting, to the UE, the at least one preconfigured uplink resource while the UE is in an active mode.

Example Embodiment D25. The method of any one of Example Embodiments D23 to D24, wherein the at least one preconfigured uplink resource is associated the unique identifier.

Example Embodiment D26. The method of any one of Example Embodiments D1 to D25, further comprising receiving, from the UE, a message indicating that a unique identifier may be released after the UE transitions to a connected state or active mode.

Example Embodiment D27. The method of any one of Example Embodiments D1 to D26, wherein the uplink signal comprises a PRACH uplink signal and wherein the preamble is reserved to a preamble resource group for positioning purposes.

Example Embodiment D28. The method of any one of Example Embodiments D1 to D27, further comprising mapping a unique identifier associated with the UE to a sequence identifier.

Example Embodiment D29. The method of Example Embodiment D28, wherein the unique identifier associated with the UE comprises a TMSI and the sequence identifier comprises at least one of a SRS sequence ID and a PRS sequence ID.

Example Embodiment D30. The method of any one of Example Embodiments D28 to D29, further comprising transmitting the mapping to a second network node operating as a LMF.

Example Embodiment D31. The method of Example Embodiments D1 to D30, further comprising: providing user data; and forwarding the user data to a host via the transmission to the network node.

Example Embodiment D32. A user equipment comprising processing circuitry configured to perform any of the methods of Example Embodiments D1 to D31.

Example Embodiment D33. A wireless device comprising processing circuitry configured to perform any of the methods of Example Embodiments D1 to D31.

Example Embodiment D34. A computer program comprising instructions which when executed on a computer perform any of the methods of Example Embodiments D1 to D31.

Example Embodiment D35. A computer program product comprising computer program, the computer program comprising instructions which when executed on a computer perform any of the methods of Example Embodiments D1 to D31.

Example Embodiment D36. A non-transitory computer readable medium storing instructions which when executed by a computer perform any of the methods of Example Embodiments D1 to D31.

Group E Example Embodiments

Example Embodiment E1. A method by a first network node for identifying a user equipment (UE) associated with an uplink signal, the method comprising: receiving, from a second network node, a mapping of a unique identifier associated with the UE to a sequence identifier; and transmitting, to a third network node, the sequence identifier to be used by the UE.

Example Embodiment E2. The method of Example Embodiment E1, wherein the first network node comprises a core network node.

Example Embodiment E3. The method of any one of Example Embodiments E1 to E2, wherein the first network node comprises and/or is operating as an LMF.

Example Embodiment E4. The method of any one of Example Embodiments E1 to E3, wherein further comprising receiving, from the second network node or another network node a measurement report for the UE.

Example Embodiment E5. The method of any one of Example Embodiments E1 to E4, wherein the UE is associated with and/or causing interference.

Example Embodiment E6. The method of any one of Example Embodiments E1 to E5, further comprising transmitting a signal to trigger the UE to transition to a connected mode.

Example Embodiment E7. The method of any one of Example Embodiments E1 to E6, further comprising transmitting a signal to trigger adaptation of a configuration of the UE.

Example Embodiment E8. The method of any one of Example Embodiments E1 to E7, wherein the uplink signal comprises a unique identifier associated with the UE.

Example Embodiment E9. The method of Example Embodiment E8, wherein the sequence identifier comprises a sounding reference signal identifier (SRS ID) or a positioning reference signal identifier (PRS ID).

Example Embodiment E10. The method of any one of Example Embodiments E1 to E8, wherein the unique identifier is associated with a spatial domain.

Example Embodiment E11. The method of Example Embodiment E10, wherein the spatial domain comprises a cell and/or radio network area.

Example Embodiment E12. The method of any one of Example Embodiments E1 to E11, further comprising transmitting a signal to trigger the UE is to move to another cell or frequency.

Example Embodiment E13. The method of any one of Example Embodiments E1 to E12, wherein the UE is in a low power state.

Example Embodiment E14. The method of Example Embodiment E13, wherein the low power state comprises an RRC inactive mode or an RRC idle mode.

Example Embodiment E15. The method of any one of Example Embodiments E1 to E16, associating at least one preconfigured uplink resource with the UE, the at least one preconfigured uplink resource comprising at least one of: One or more slot(s) in which the at least one preconfigured uplink resource is defined; One or more symbols within the slot(s); a Comb number used for transmission of an uplink signal by the UE; and a cyclic shift $\alpha_i$ for an uplink signal.

Example Embodiment E16. The method of Example Embodiment E15, further comprising transmitting, to the UE, the at least one preconfigured uplink resource while the UE is in an active mode.

Example Embodiment E17. The method of any one of Example Embodiments E15 to E16, wherein the at least one preconfigured uplink resource is associated the unique identifier and/or the sequence ID.

Example Embodiment E18. The method of any one of Example Embodiments E1 to E17, further comprising receiving, from the UE, a message indicating that the unique identifier may be released after the UE transitions to a connected state or active mode.

Example Embodiment E19. The method of Example Embodiments E1 to E18, further comprising: providing user data; and forwarding the user data to a host via the transmission to the network node.

Example Embodiment E20. A user equipment comprising processing circuitry configured to perform any of the methods of Example Embodiments E1 to E19.

Example Embodiment E21. A wireless device comprising processing circuitry configured to perform any of the methods of Example Embodiments E1 to E19.

Example Embodiment E22. A computer program comprising instructions which when executed on a computer perform any of the methods of Example Embodiments E1 to E19.

Example Embodiment E23. A computer program product comprising computer program, the computer program comprising instructions which when executed on a computer perform any of the methods of Example Embodiments E1 to E19.

Example Embodiment E24. A non-transitory computer readable medium storing instructions which when executed by a computer perform any of the methods of Example Embodiments E1 to E19.

Group F Example Embodiments

Example Embodiment F1. A user equipment comprising: processing circuitry configured to perform any of the steps of any of the Group A and C Example Embodiments; and power supply circuitry configured to supply power to the processing circuitry.

Example Embodiment F2. A network node comprising: processing circuitry configured to perform any of the steps of any of the Group B and D and E Example Embodiments; power supply circuitry configured to supply power to the processing circuitry.

Example Embodiment F3. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A and C Example Embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment F4. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A and C Example Embodiments to receive the user data from the host.

Example Embodiment F5. The host of the previous Example Embodiment, wherein the cellular network further includes a network node configured to communicate with the UE to transmit the user data to the UE from the host.

Example Embodiment F6. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment F7. A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A and C embodiments to receive the user data from the host.

Example Embodiment F8. The method of the previous Example Embodiment, further comprising: at the host, executing a host application associated with a client application executing on the UE to receive the user data from the UE.

Example Embodiment F9. The method of the previous Example Embodiment, further comprising: at the host, transmitting input data to the client application executing on the UE, the input data being provided by executing the host application, wherein the user data is provided by the client application in response to the input data from the host application.

Example Embodiment F10. A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A and C Example Embodiments to transmit the user data to the host.

Example Embodiment F11. The host of the previous Example Embodiment, wherein the cellular network further includes a network node configured to communicate with the UE to transmit the user data from the UE to the host.

Example Embodiment F12. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment F13. A method implemented by a host configured to operate in a communication system that further includes a network node and a user equipment (UE), the method comprising: at the host, receiving user data transmitted to the host via the network node by the UE, wherein the UE performs any of the steps of any of the Group A and C Example Embodiments to transmit the user data to the host.

Example Embodiment F14. The method of the previous Example Embodiment, further comprising: at the host, executing a host application associated with a client application executing on the UE to receive the user data from the UE.

Example Embodiment F15. The method of the previous Example Embodiment, further comprising: at the host, transmitting input data to the client application executing on the UE, the input data being provided by executing the host application, wherein the user data is provided by the client application in response to the input data from the host application.

Example Embodiment F16. A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B and D and E Example Embodiments to transmit the user data from the host to the UE.

Example Embodiment F17. The host of the previous Example Embodiment, wherein: the processing circuitry of the host is configured to execute a host application that provides the user data; and the UE comprises processing circuitry configured to execute a client application associated with the host application to receive the transmission of user data from the host.

Example Embodiment E18. A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B and D and E Example Embodiments to transmit the user data from the host to the UE.

Example Embodiment F19. The method of the previous Example Embodiment, further comprising, at the network node, transmitting the user data provided by the host for the UE.

Example Embodiment F20. The method of any of the previous 2 Example Embodiments, wherein the user data is provided at the host by executing a host application that interacts with a client application executing on the UE, the client application being associated with the host application.

Example Embodiment F21. A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B and D and E Example Embodiments to transmit the user data from the host to the UE.

Example Embodiment F22. The communication system of the previous Example Embodiment, further comprising: the network node; and/or the user equipment.

Example Embodiment F23. A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B and D and E Example Embodiments to receive the user data from a user equipment (UE) for the host.

Example Embodiment F24. The host of the previous 2 Example Embodiments, wherein: the processing circuitry of the host is configured to execute a host application, thereby providing the user data; and the host application is configured to interact with a client application executing on the UE, the client application being associated with the host application.

Example Embodiment F25. The host of the any of the previous 2 Example Embodiments, wherein the initiating receipt of the user data comprises requesting the user data.

Example Embodiment F26. A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B and D and E Example Embodiments to receive the user data from the UE for the host.

Example Embodiment F27. The method of the previous Example Embodiment, further

The invention claimed is:

1. A method by a User Equipment (UE) for identification of the UE for positioning, the method comprising:

receiving information indicating preconfigured uplink resource; and transmitting, when the UE is in a low power state, to a network node, an uplink signal that is generated based on a unique identifier associated with the UE on the preconfigured uplink resource, wherein the unique identifier is associated with multiple cells or a Radio Network Area (RNA).

2. The method of claim 1, further comprising:

receiving, the unique identifier from a network node, the network node being a gNodeB serving the UE, or a core network node serving a region of the multiple cells or the RNA, wherein the unique identifier is valid within the multiple cells or the RNA.

3. The method of claim 1, wherein the unique identifier is a sequence identifier, and it is mapped to a Temporary Mobile Subscriber, Identifier (TMSI) or International Mobile Subscriber Identity (IMSI) of the UE.

4. The method of claim 2, wherein the core network node is an Application Management Function (AMF) or Location Management Function (LMF), and wherein the uplink signal comprises a sounding reference signal.

5. The method of claim 2, further comprising: receiving, from the core network node or the gNodeB, a message that indicates the UE is to move to another cell or frequency.

6. The method of claim 1, wherein the preconfigure uplink resource on which the uplink signal is transmitted is associated with the unique identifier.

7. The method of claim 1, comprising:

performing a connection resume procedure; and transmitting, to a network node, a message indicating that the unique identifier can be released when the UE is to connect to a cell out of the multiple cells or the RNA.

8. The method of claim 1, wherein the preconfigured uplink resource comprises at least one of:

one or more slots in which the at least one preconfigured uplink resource is defined;

one or more symbols within a slot(s);

a Comb number to be used for transmission of the uplink signal; and a cyclic shift for the uplink signal.

9. A method by a first network node comprising a gNodeB and/or a listening node, the method comprising:

receiving, from second network node operating as a Location Management Function (LMF) or an Application Management Function (AMF), a unique identifier to be used by a User Equipment (UE), wherein the unique identifier is valid within a region of multiple cells or a Radio Network-Area (RNA);

transmitting the unique identifier to the UE;

detecting an uplink signal from the UE in a low power state, the uplink signal comprising the unique identifier;

based on the unique identifier, identifying the UE from which the uplink signal is sent; and in response to identifying the UE associated with the uplink signal, performing at least one positioning operation associated with the UE.

10. The method of claim 9, wherein performing the at least one positioning operation comprises at least one of:

transmitting, to a second network node, a measurement report for the UE;

determining that the UE is associated with and/or causing interference;

transmitting, to the UE, a signal to trigger the UE to transition to a connected mode; and transmitting an adapted configuration to the UE.

11. The method of claim 9, wherein the uplink signal comprises a sounding reference signal and, wherein the unique identifier is a sequence identifier.

12. The method of claim 9, further comprising: while the UE is in an active state, transmitting an indication of preconfigured uplink resource to the UE, wherein the uplink signal is detected on the at least one preconfigured uplink resource, the preconfigured uplink resource comprising at least one of:

one or more slots in which the at least one preconfigured uplink resource is defined;

one or more symbols within a slot;

a Comb number used for transmission of the uplink signal by the UE; and a cyclic shift for the uplink signal.

13. A method by a core network node operating as a Location Management Function (LMF) the method comprising:

transmitting, a unique identifier to be used by a User Equipment (UE) to a network node operating as a gNodeB or listening node, wherein the unique identifier is applicable to multiple cells or a Radio Network Area (RNA) within which region the core network node is functioning;

receiving, from the network node, a measurement report for the UE according to an uplink signal generated based on the unique identifier, wherein the UE is in a low power state.

14. The method of claim 13, further comprising: determining that the UE is associated with and/or causing interference; and indicating the UE to convert to connected mode.

15. The method of claim 13, wherein the unique identifier is a sequence identifier used for generating a sounding reference signal comprised in the uplink signal; wherein the sequence identifier is mapped to a Temporary Mobile Subscriber Identifier (TMSI) or International Mobile Subscriber Identity (IMSI) of the UE.

16. A user equipment (UE) for unique identification of the UE for positioning, the UE comprising:

memory storing instructions; and processing circuitry configured to execute the instructions to cause the UE to:

receive information indicating preconfigured uplink resource; and transmit, when the UE is in a low power state, to a network node, an uplink signal that is generated based on a unique identifier associated with the UE on the preconfigured uplink resource, wherein the unique identifier is associated with multiple cells or a Radio Network Area (RNA).

17. A first network node comprising a gNodeB and/or a listening node, the first network node comprising:

memory storing instructions; and processing circuitry configured to execute the instructions to cause the first network node to:

receive, from second network node operating as a Location Management Function (LMF) or an Application Management Function (AMF), a unique identifier to be used by a User Equipment (UE), wherein the unique identifier is valid within a region of multiple cells or a Radio Network-Area (RNA);

transmit the unique identifier to the UE;

detect an uplink signal from the UE in a low power state, the uplink signal comprising the unique identifier;

based on the unique identifier, identify the UE from which the uplink signal is sent; and in response to identifying the UE associated with the uplink signal, perform at least one positioning operation associated with the UE.

18. A core network node comprising:

memory storing instructions; and processing circuitry configured to execute the instructions to cause the core network node to:

transmit, a unique identifier to be used by a User Equipment (UE) to a network node operating as a gNodeB or listening node, wherein the unique identifier is applicable to multiple cells or a Radio Network Area (RNA) within which region the core network node is functioning; and receive, from the network node, a measurement report for the UE according to an uplink signal generated based on the unique identifier, wherein the UE is in a low power state.

* * * * *